United States Patent
Wakazono

(10) Patent No.: US 8,693,799 B2
(45) Date of Patent: Apr. 8, 2014

(54) IMAGE PROCESSING APPARATUS FOR EMPHASIZING DETAILS OF AN IMAGE AND RELATED APPARATUS AND METHODS

(75) Inventor: Masafumi Wakazono, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/472,610

(22) Filed: May 16, 2012

(65) Prior Publication Data

US 2012/0301048 A1    Nov. 29, 2012

(30) Foreign Application Priority Data

May 25, 2011 (JP) ................................. 2011-117468

(51) Int. Cl.
*G06K 9/36* (2006.01)

(52) U.S. Cl.
USPC ......................................................... 382/264

(58) Field of Classification Search
None
See application file for complete search history.

(56) References Cited

U.S. PATENT DOCUMENTS

| | | | |
|---|---|---|---|
| 4,827,528 A | 5/1989 | Macovski | |
| 4,962,426 A | 10/1990 | Naoi et al. | |
| 5,012,333 A | 4/1991 | Lee et al. | |
| 5,673,355 A | 9/1997 | Strolle et al. | |
| 5,732,159 A | 3/1998 | Jung | |
| 5,978,518 A | 11/1999 | Oliyide et al. | |
| 6,285,798 B1 | 9/2001 | Lee | |
| 6,895,124 B1 | 5/2005 | Kira et al. | |
| 7,418,150 B2 | 8/2008 | Myoga | |
| 7,848,560 B2 | 12/2010 | Wang et al. | |
| 8,471,928 B2 | 6/2013 | Yoo et al. | |
| 2005/0175247 A1* | 8/2005 | Kitamura et al. | 382/236 |
| 2006/0103892 A1* | 5/2006 | Schulze et al. | 358/463 |
| 2006/0133688 A1* | 6/2006 | Kang et al. | 382/254 |
| 2008/0056600 A1 | 3/2008 | Wang et al. | |
| 2008/0187235 A1 | 8/2008 | Wakazono et al. | |
| 2009/0167673 A1 | 7/2009 | Kerofsky | |
| 2010/0166331 A1* | 7/2010 | Chan et al. | 382/254 |
| 2010/0177981 A1* | 7/2010 | Wang et al. | 382/260 |
| 2010/0208807 A1 | 8/2010 | Sikora | |
| 2010/0265385 A1* | 10/2010 | Knight et al. | 348/340 |
| 2010/0310189 A1 | 12/2010 | Wakazono et al. | |
| 2011/0013848 A1* | 1/2011 | Hasegawa | 382/232 |
| 2011/0128296 A1 | 6/2011 | Mihara et al. | |
| 2012/0002890 A1* | 1/2012 | Mathew | 382/232 |
| 2012/0301050 A1 | 11/2012 | Wakazono | |

FOREIGN PATENT DOCUMENTS

JP    2008-243059 A    10/2008

* cited by examiner

*Primary Examiner* — Bhavesh Mehta
*Assistant Examiner* — Feng Niu
(74) *Attorney, Agent, or Firm* — Wolf, Greenfield & Sacks, P.C.

(57) ABSTRACT

There is provided an image processing apparatus. The image processing apparatus includes a first image processing unit configured to perform image processing affecting a high frequency component used to generate a detail component of an image. The image processing apparatus includes a detail component generating unit configured to generate the detail component, which is emphasized, using an output of the first image processing unit. The image processing apparatus includes an emphasis unit configured to emphasize detail of the image by combining the emphasized detail component generated by the detail component generating unit with the image.

9 Claims, 14 Drawing Sheets

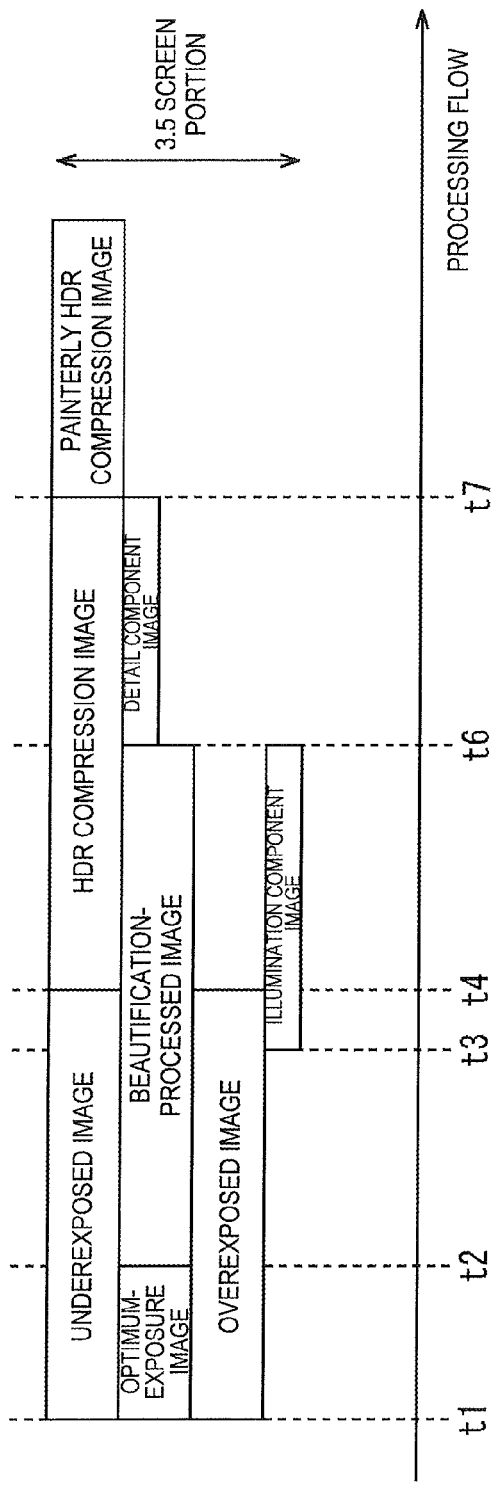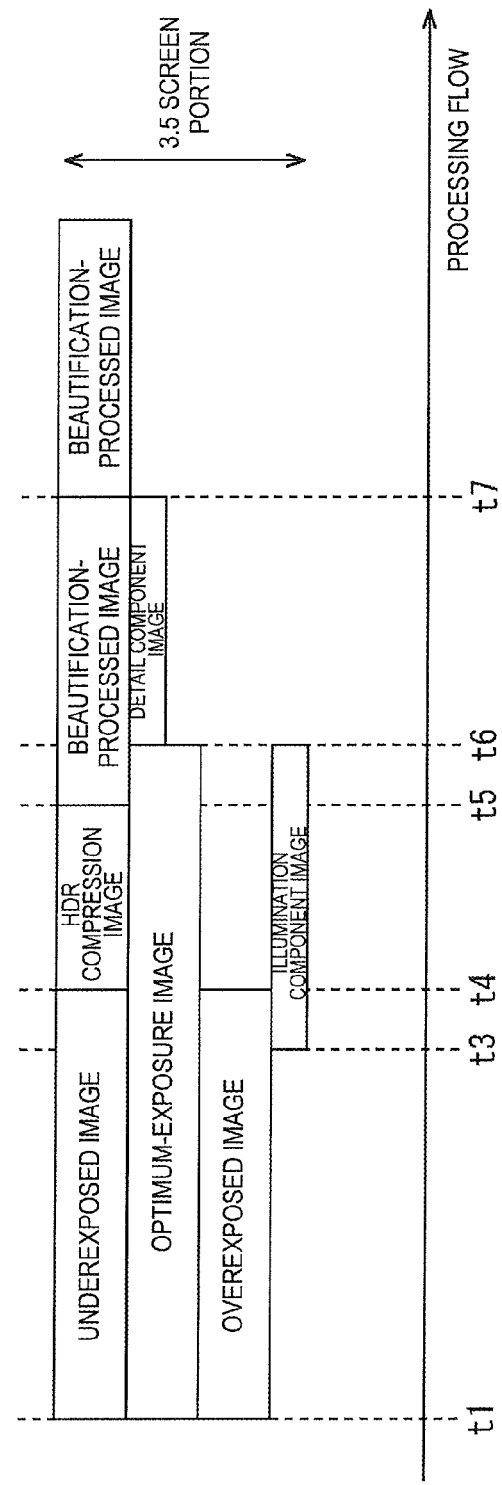

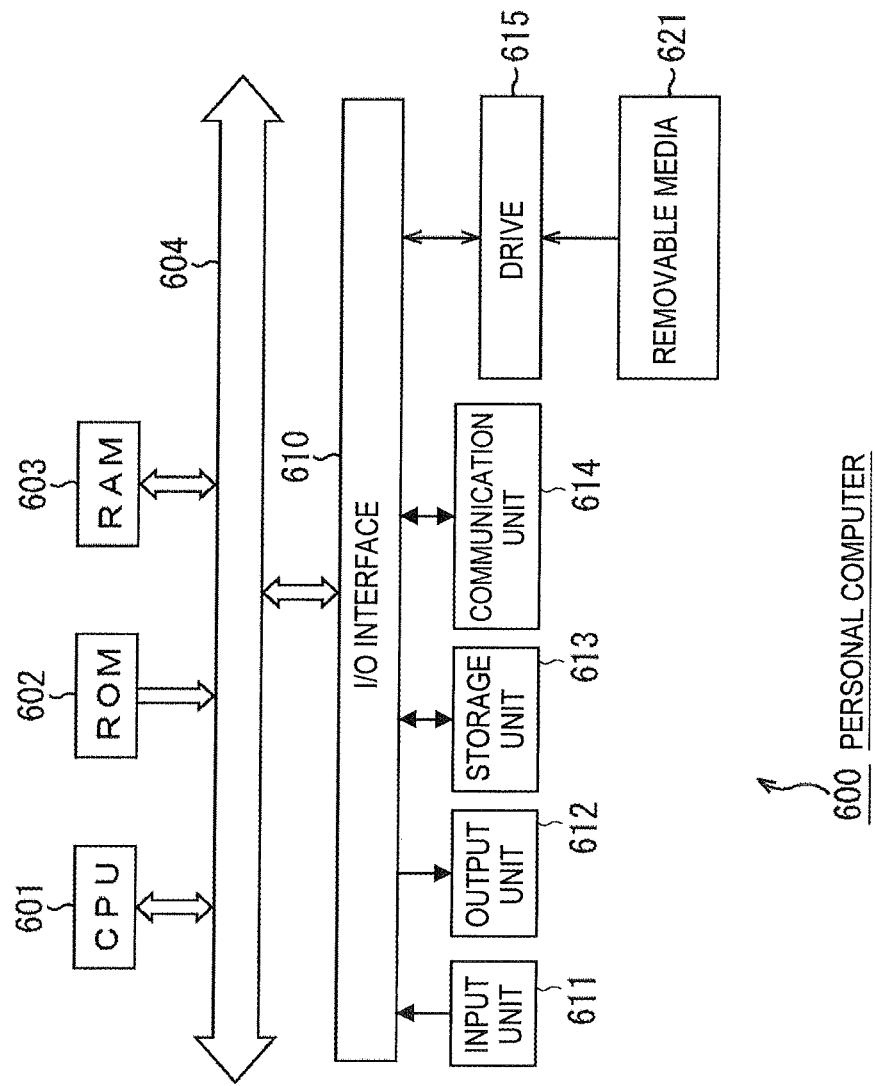

IMAGE PROCESSING APPARATUS FOR EMPHASIZING DETAILS OF AN IMAGE AND RELATED APPARATUS AND METHODS

RELATED APPLICATIONS

The present application claims priority to Japanese Patent Application JP 2011-117468 filed in the Japan Patent Office on May 25, 2011, which is incorporated herein by reference in its entirety.

BACKGROUND

The present disclosure relates to an image processing apparatus and method, and more particularly, to an image processing apparatus and method which can provide an image with more various effects.

Generally, High Dynamic Range (HDR) compression processing is being considered for compression and optimization of the tonal range of an image with a wide dynamic range (for example, refer to Patent Application Publication No. 2008-104010 (corresponding U.S. Patent Application No. US2008/0187235)).

For example, Patent Application Publication No. 2008-104010 discloses a method of acquiring an image with a typical range. In the method, an image with a wide dynamic range is created from a plurality of images with different exposures, and then the image is separated into a low frequency component and a high frequency component (detail component) using a smoothing filter. The tonal range of the low frequency component is compressed, and only a detail component corresponding to the amount of compression is emphasized. Finally, both components after the processing are combined to acquire the image of the typical range.

Also, a method of creating an image with a typical range from a plurality of images without combining an image with a wide dynamic range is disclosed.

SUMMARY

However, in recent years, it is necessary to give different effects to an HDR compressed image as well as compress a tonal range.

Thus, the present disclosure provides an image processing apparatus and method that can give more various effects to an image by processing the tone of the image and giving different visual effects to the image.

According to an embodiment of the present disclosure, there is provided an image processing apparatus which includes: a first image processing unit configured to perform image processing affecting a high frequency component used to generate a detail component of an image; a detail component generating unit configured to generate the detail component, which is emphasized, using an output of the first image processing unit; and an emphasis unit configured to emphasize detail of the image by combining the emphasized detail component generated by the detail component generating unit with the image.

The image processing may include reducing an unnecessary high frequency component.

The image processing may include beautification processing for reducing the unnecessary high frequency component of a desired region.

The beautification processing may include skin-beautifying processing that reduces the unnecessary high frequency component of a skin region.

The image processing apparatus may further include: an emphasis amount controlling unit configured to control an emphasis amount of the detail component generated by the detail component generating unit; and a processing controlling unit configured to control whether to perform the image processing by the first image processing unit, wherein the processing controlling unit controls the first image processing unit to perform the image processing when the emphasis amount controlling unit sets the emphasis amount to a large value, and controls the first image processing unit not to perform the image processing when the emphasis amount controlling unit sets the emphasis amount to a small value.

The image processing apparatus may further include a combination unit configured to generate an image in which a tonal range of a luminance signal is compressed, by combining a plurality of images with different exposure conditions, wherein the emphasis unit emphasizes the detail of the image generated by the combination unit by combining the emphasized detail component generated by the detail component generating unit with the image.

The plurality of images with different exposure conditions may include an underexposed image with decreased exposure below an optimum value, an optimum-exposure image with optimum exposure, and an overexposed image with increased exposure beyond the optimum value, and the first image processing unit may perform the image processing on the optimum-exposure image.

The image processing apparatus may further include a second image processing unit configured to perform the image processing on the image obtained by combining by the combination unit, wherein the emphasis unit emphasizes detail of the image on which the second image processing unit performs the image processing by combining the emphasized detail component generated by the detail component generating unit with the image.

The image processing apparatus may further include: a combination unit configured to generate an image in which a tonal range of a luminance signal is compressed, by combining a plurality of images with different exposure conditions and the component in which the image processing is performed by the first image processing unit; a second image processing unit configured to perform the image processing on the image combined by the combination unit; an emphasis amount controlling unit configured to control an emphasis amount of the detail component generated by the detail component generating unit; and a processing controlling unit configured to control whether to perform the image processing by the first image processing unit and the second image processing unit, wherein the processing controlling unit controls the first image processing unit to perform the image processing and controls the second image processing unit not to perform the image processing when the emphasis amount controlling unit sets the emphasis amount to a large value, and controls the second image processing unit to perform the image processing and controls the first image processing unit not to perform the image processing when the emphasis amount controlling unit sets the emphasis amount to a small value.

The plurality of images with different exposure conditions may include an underexposed image with decreased exposure below an optimum value, an optimum-exposure image with optimum exposure, and an overexposed image with increased exposure beyond the optimum value, and the first image processing unit may perform the image processing on the optimum-exposure image.

According to another embodiment of the present disclosure, there is provided an image processing method using an image processing apparatus, which includes: performing image processing affecting a high frequency component used to generate a detail component of an image; generating the detail component, which is emphasized, using the component on which the image processing affecting the high frequency component is performed; and emphasizing detail of the image by combining the emphasized detail component with the image.

According to the embodiments of the present disclosure described above, image processing affecting a high frequency component used to generate a detail component of an image may be performed, and an emphasized detail component may be generated using the component on which the image processing affecting the high frequency component is performed. Also, detail of the image may be emphasized by combining the generated and emphasized detail component with the image.

According to the embodiments of the present disclosure described above, images can be processed. Particularly, more various effects can be given to an image.

BRIEF DESCRIPTION OF THE DRAWINGS

FIGS. 12A and 12B show diagrams illustrating other exemplary changes of a used amount of memory;

FIG. 14 is a block diagram illustrating an exemplary main configuration of a personal computer.

DETAILED DESCRIPTION OF THE EMBODIMENT(S)

Hereinafter, exemplary embodiments of the present disclosure will be described in detail with reference to the accompanying drawings. Description will be made in the following sequence. 1. First Embodiment (Image Processing Apparatus), 2. Second Embodiment (Image Processing Apparatus), 3. Third Embodiment (Image Processing Apparatus), 4. Fourth Embodiment (Image Processing Apparatus), 5. Fifth Embodiment (Imaging Device), and 6. Sixth Embodiment (Personal Computer).

1. First Embodiment

Image Processing Apparatus

Figure 1:
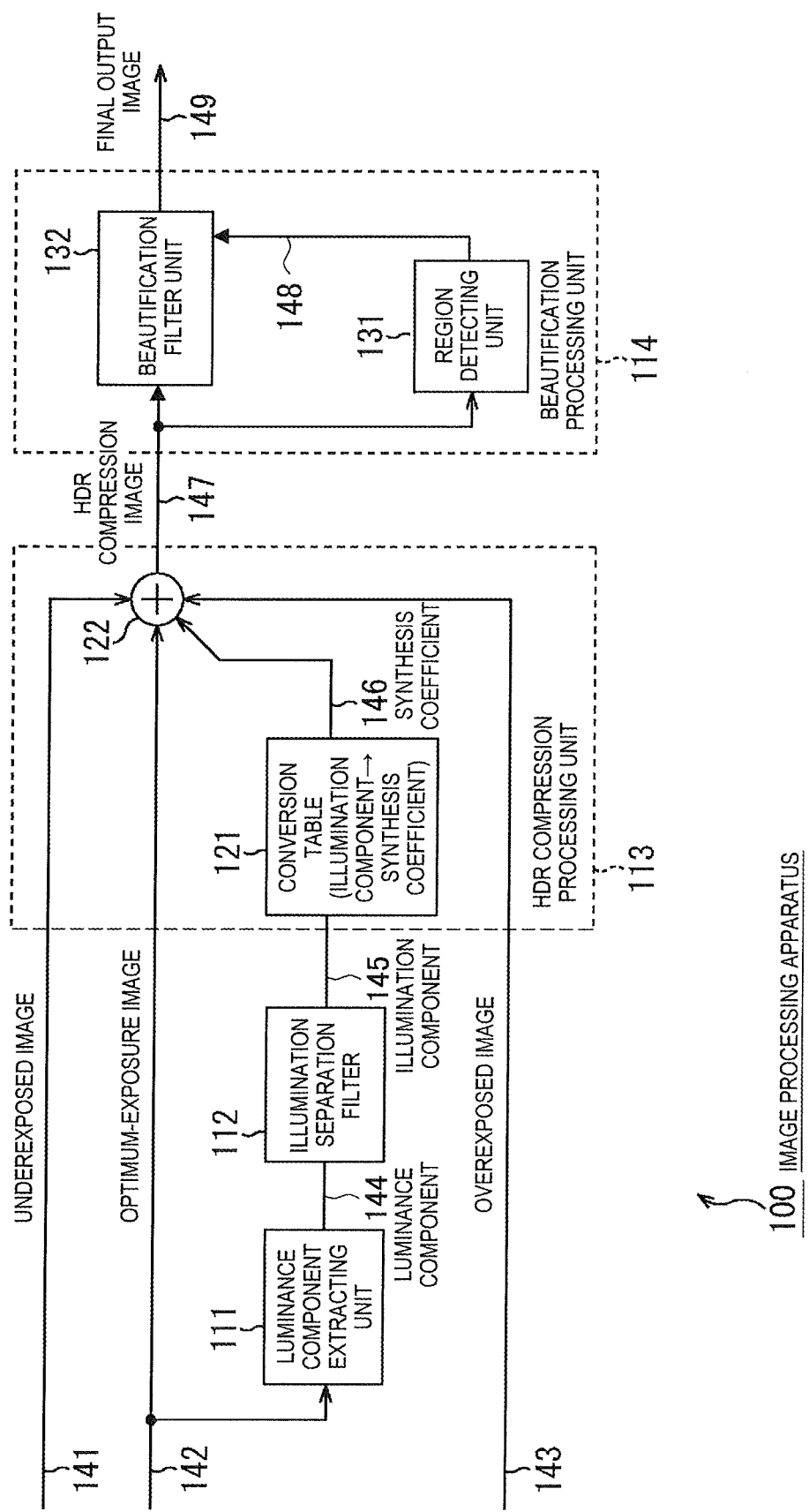
FIG. 1 is a block diagram illustrating an exemplary main configuration of an image processing apparatus for processing a tone of an image.

FIG. 1 illustrates an exemplary image processing apparatus.

An image processing apparatus 100 shown in FIG. 1 may perform beautification processing for improving the image quality visually, by combining a plurality of images with different exposure conditions such that deterioration of the image quality such as brightening or darkening does not occur, performing HDR processing for generating an image with an appropriate tonal range, and performing smoothing processing in a specific region.

For example, in a scene in which the luminance range within a view angle is wide, the precision of auto exposure processing (AE processing) may be reduced, and a main subject within the view angle may be brightened due to overexposure, or may be buried in noise or darkened due to underexposure. Accordingly, as an imaging method for acquiring an image captured with appropriate exposure conditions in such a scene, a method called "exposure bracketing" in which a plurality of image signals are acquired by performing continuous exposure several times while varying the exposure conditions has been known.

An imaging method by which an image (wide dynamic range image) with a dynamic range wider than the output of an imaging element can be acquired using exposure bracketing is being considered. In the imaging of the wide dynamic range image, an image captured by sufficient exposure through exposure bracketing and an image captured by decreased exposure may be acquired, and the images may be combined to an image with a wide dynamic range. In other words, it is possible to introduce information on a tone with a wide luminance range that cannot be acquired from a single exposure into the image after the combination process, by combining an image component acquired with a tone at a high luminance side by decreasing exposure and an image component acquired with a tone at a low luminance side by increasing exposure.

A plurality of images (an underexposed image, an optimum-exposure image, and an overexposed image) with different exposure conditions, which are acquired by the above imaging, may be input into the image processing apparatus 100 (arrows 141 through 143).

The image processing apparatus 100 may include a luminance component extracting unit 111, an illumination separation filter 112, an HDR compression processing unit 113, and a beautification processing unit 114.

The HDR compression processing performed by the HDR compression processing unit 113 is an example of image combining processing. The HDR compression processing includes image combining processing and tone optimization processing. The HDR compression processing unit 113 may include a conversion table 121 and a combination unit 122. The beautification processing unit 114 may include a region detecting unit 131 and a beautification filter 132.

As described above, an underexposed image generated by intentionally decreasing exposure below an optimum value, an optimum-exposure image generated with the optimum value, and an overexposed image generated by intentionally increasing exposure beyond the optimum value may be input into the image processing apparatus 100. Each image may be supplied to the HDR compression processing unit 113 (arrows 141 through 143).

Also, the optimum-exposure image may be supplied to the luminance component extracting unit 111 (arrow 142). The luminance component extracting unit 111 may extract a luminance component from the input optimum-exposure image, and may supply the luminance component to the illumination separation filter 112 (arrow 144).

The illumination separation filter 112 may extract an illumination component from the input luminance component using an edge preserving smoothing filter. The illumination separation filter 112 may supply the extracted illumination component to the HDR compression processing unit 113 (arrow 145). The illumination component may be supplied to the conversion table 121.

The HDR compression processing unit 113 may be a processing unit that performs HDR processing for combining a plurality of images with different exposure conditions input such that deterioration of the image quality does not occur and generating an image with an appropriate tonal range.

The conversion table 121 may convert the illumination component supplied from the illumination separation filter 315 into a combination coefficient using a certain conversion table. The combination coefficient may include a percentage of the underexposed image, a percentage of the optimum-exposure image, and a percentage of the overexposed image. The conversion table 121 may supply the combination coefficient to the combination unit 122 (arrow 146).

The combination unit 122 may combine the underexposed image, the optimum-exposure image and the overexposed image that are input using the supplied combination coefficient. More specifically, the combination unit 122 may weight each image using the combination coefficient to add the weighted images to each other. The combination unit 122 may generate an image (HDR compressed image) with an appropriate tonal range, which is combined such that the deterioration of the image quality such as brightening or darkening does not occur, from the underexposed image, the optimum-exposure image, and the overexposed image. The combination unit 122 may supply the generated HDR compressed image to the beautification processing unit 114 (arrow 147). The HDR compressed image may be supplied to the region detecting unit 131 and the beautification filter 132.

The beautification processing unit 114 may perform certain image processing such as smoothing processing on a certain region of the input image. For example, the beautification processing unit 114 may be a processing unit that gives a visual effect such as visual improvement of the image quality. For example, the beautification processing unit 114 may detect a skin part (skin region) of a figure in an image, and may perform smoothing processing on the skin region to remove spots and wrinkles (referred to as skin-beautifying processing).

The region detecting unit 131 may detect a desired region (e.g., a skin region in the case of skin-beautifying processing), which is a target region for skin-beautifying processing, from the HDR compressed image supplied from the combination unit 122. The region detecting unit 131 may supply the detection result to the beautification filter 132 (arrow 148).

The beautification filter 132 may perform a beautification filter operation (e.g., smoothing processing, etc.) on the target region of the HDR compressed image supplied from the combination unit 122 and detected by the region detecting unit 131. The beautification filter 132 may output a filter processing result to the output of the image processing apparatus 100 as a final output image (arrow 149).

Also, the beautification filter 132 may store the final output image in a storage unit (not shown) provided in the image processing apparatus 100.

Thus, the image processing apparatus 100 may perform the beautification processing as well as the HDR processing on the input image. The image processing apparatus 100 may give more various effects to the image.

In the image processing apparatus 100, a painterly visual effect may also be given together with the HDR processing by excessively emphasizing detail of the image. In this case, a detail component of an HDR compressed image output from the HDR compression processing unit 113 may be excessively emphasized to generate a painterly HDR compressed image, and the painterly HDR compressed image may be beautified by the beautification processing unit 114.

For example, in order to emphasize eyelashes while suppressing wrinkles, it is determined by the amplitude of a high frequency component whether or not a detected detail is a wrinkle, and only a detail corresponding to the wrinkle may be suppressed. However, when an output of the painterly HDR compression processing is processed, since the amplitude of the detail is emphasized, the performance of determining whether or not the detail is a wrinkle may be reduced, failing to achieve a skin-beautifying processing effect.

Also, signals that are not intended to be originally emphasized may be included in a detail emphasized by the painterly HDR compression processing. For example, spots or wrinkles of skin and noise in skyey region may be provided. When such signals are emphasized, although the image is provided with texture, it may become an image that gives an undesirable impression.

2. Second Embodiment

Imaging Processing Apparatus

Figure 2:
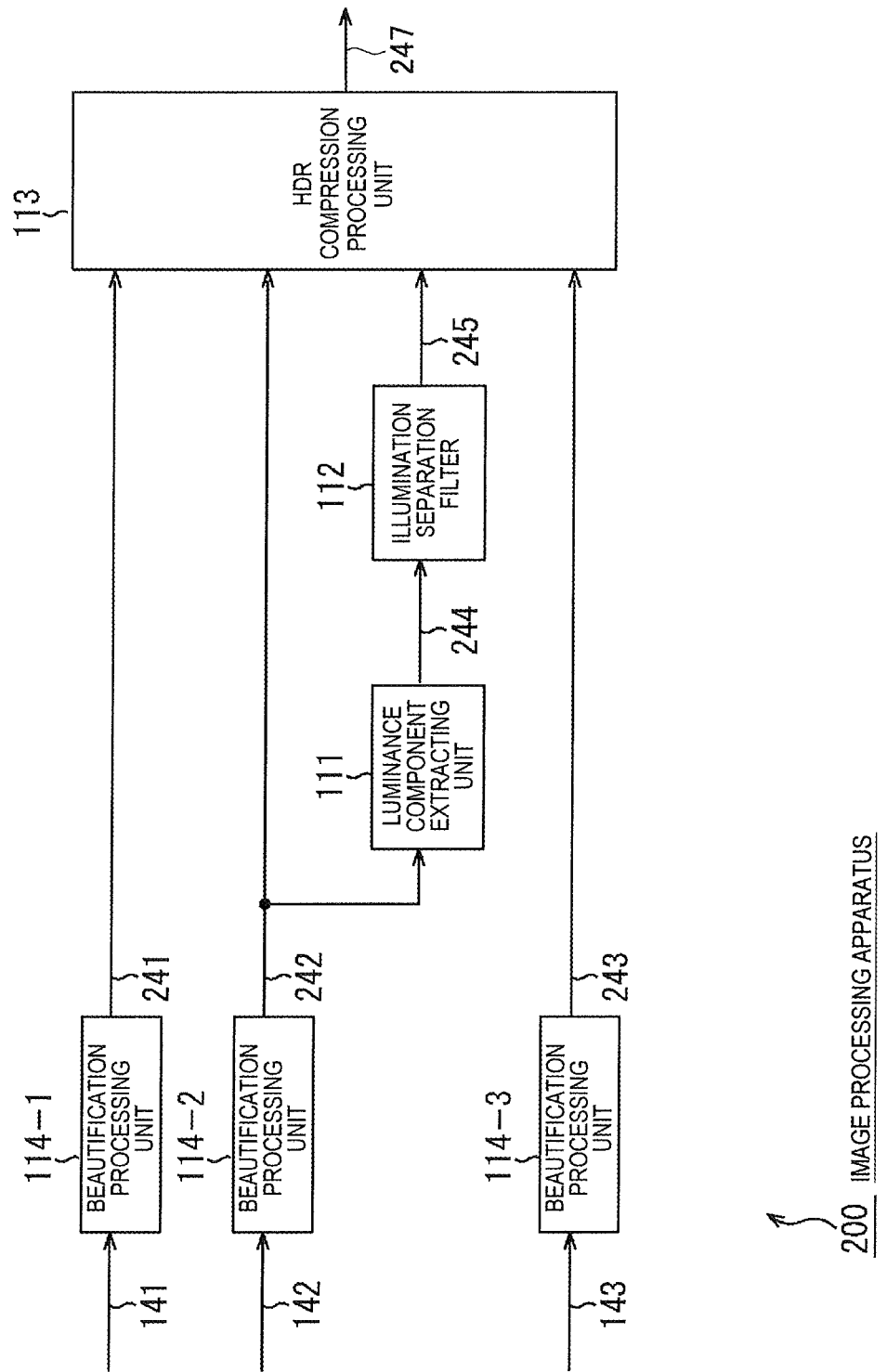
FIG. 2 is a block diagram illustrating another exemplary configuration of an image processing apparatus.

Accordingly, as shown in FIG. 2, a method of performing beautification processing prior to HDR processing may be considered. FIG. 2 is a block diagram illustrating another exemplary configuration of an image processing apparatus.

An image processing apparatus 200 shown in FIG. 2 may be basically similar to the image processing apparatus 100. The image processing apparatus 200 may perform beautification processing for improving the image quality visually by combining a plurality of images with different exposure conditions such that deterioration of the image quality such as brightening or darkening does not occur, performing HDR processing for generating an image with an appropriate tonal range, and performing smoothing processing in a specific region.

However, the image processing apparatus 200 may perform the HDR processing after the beautification processing. As shown in FIG. 2, the image processing apparatus 200 may include beautification processing units 114-1 to 114-3, a luminance component extracting unit 111, an illumination separation filter 112, and an HDR compression processing unit 113.

The beautification processing units 114-1 to 114-3 may be configured similarly to the beautification processing unit 114 of FIG. 1 and may perform processing similar to that of FIG. 1, respectively. The beautification processing unit 114-1 may perform beautification processing on an underexposed image, and may supply the processing result to the HDR compression processing unit 113 (arrow 241). Also, the beautification processing unit 114-2 may perform beautification processing on an optimum-exposure image, and may supply the processing result to the HDR compression processing unit 113 and the luminance component extracting unit 244 (arrow 242). Also, the beautification processing unit 114-3 may perform beautification processing on an overexposed image, and may supply the processing result to the HDR compression processing unit 113 (arrow 243).

The luminance component extracting unit 111 may extract a luminance component from the beautified optimum-exposure image, and may supply the luminance component to the illumination separation filter 112 (arrow 244). The illumination separation filter 112 may extract an illumination component from the luminance component of the beautified optimum-exposure image, and may supply the illumination component to the HDR compression processing unit 113 (arrow 245).

The HDR compression processing unit 113 may obtain a combination coefficient from the illumination component, and by the combination coefficient, may weight and combine the beautified underexposed image, the beautified optimum-exposure image, and the beautified overexposed image to output the combined image as an HDR compressed image (arrow 247).

Thus, the image processing apparatus 200 may perform the beautification processing as well as the HDR processing on input images. The image processing apparatus 200 may give more various effects to the images.

However, in this method, since the beautification processing is performed on all images (an underexposed image, an optimum-exposure image, and an overexposed image) input into the image processing apparatus 200, the process load (throughput or process time) may increase each time the beautification processing is performed.

3. Third Embodiment

Image Processing Apparatus

Figure 3:
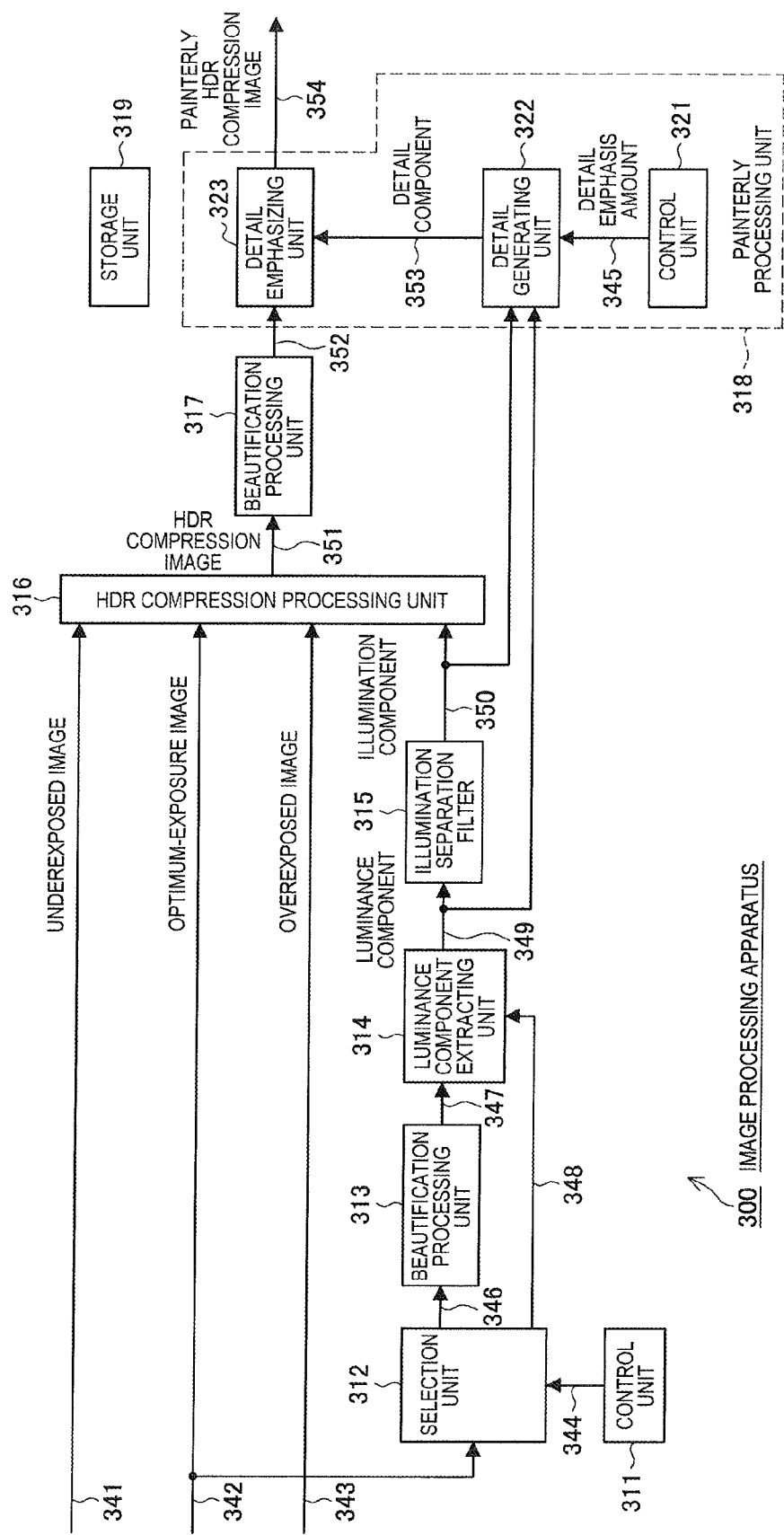
FIG. 3 is a block diagram illustrating another exemplary main configuration of an image processing apparatus.

FIG. 3 is a block diagram illustrating another exemplary configuration of an image processing apparatus.

The image processing apparatus 300 shown in FIG. 3 may perform HDR processing and beautification processing similar to those of the image processing apparatus 100 and the image processing apparatus 200, and may further perform painterly processing for giving a painterly visual effect to an image.

The image processing apparatus 300 as shown in FIG. 3, may include a control unit 311, a selection unit 312, a beautification processing unit 313, a luminance component extracting unit 314, an illumination separation filter 315, an HDR compression processing unit 316, a beautification processing unit 317, a painterly processing unit 318, and a storage unit 319.

The painterly processing unit 318 may include a control unit 321, a detail generating unit 322, and a detail emphasizing unit 323.

An underexposed image input into the image processing apparatus 300 may be supplied to the HDR compression processing unit 316 (arrow 341). An optimum-exposure image input into the image processing apparatus 300 may be supplied to the HDR compression processing unit 316 and the selection unit 312 (arrow 342). An overexposed image input into the image processing apparatus 300 may be supplied to the HDR compression processing unit 316 (arrow 343).

The control unit 311 may control the selection unit 312 to perform the beautification processing in the beautification processing unit 313 according to whether or not to perform the painterly processing (arrow 344). Whether or not to perform the painterly processing may be instructed from the outside such as a by user or other devices. Alternatively, the control unit 311 may also determine whether or not to perform the painterly processing based on setting information that is pre-stored by the storage unit 311.

The selection unit 312 may supply the supplied optimum-exposure image to one of the beautification processing unit 313 and the luminance component extracting unit 314 according to the control of the control unit 311. For example, when performing the beautification processing, the selection unit 312 may supply the optimum-exposure image to the beautification processing unit 313 (arrow 346). Also, when not performing the beautification processing, the selection unit 312 may supply the optimum exposure image to the luminance component extracting unit 314 (arrow 348).

The beautification processing unit 313 may be configured similarly to the beautification processing unit 114 of FIG. 1 and may perform processing similar to that of FIG. 1. The beautification processing unit 313 may include a region detection unit 131 and a beautification filter 132, detect a target region from the supplied optimum-exposure image, and perform beautification processing for a beautification filter operation with respect to the target region. The beautification processing unit 313 may supply the beautified optimum-exposure image to the luminance component extracting unit 314 (arrow 347).

The luminance component extracting unit 314 may be configured similarly to the luminance component extracting unit 111 of FIG. 1, and may perform processing similar to that of FIG. 1. The luminance component extracting unit 314 may extract a luminance component from the supplied optimum-exposure image (beautified optimum-exposure image supplied from the beautification processing unit 313 or unbeautified optimum-exposure image (i.e., selected by the selection unit 312) supplied from the selection unit 312). The luminance component extracting unit 314 may supply the extracted luminance component to the illumination separation filter 315 and the detail generating unit 322 (arrow 349). Also, without the section unit 312, the beautification processing unit 313 may perform the beautification processing or omit the beautification according to the control of the control unit 311.

The illumination separation filter 315 may be configured similarly to the illumination separation filter 112 of FIG. 1, and may perform processing similar to that of FIG. 1. The illumination separation filter 315 may extract an illumination component (also referred to as low frequency component) from the input luminance component using an edge preserving smoothing filter. The illumination separation filter 315 may supply the extracted illumination component to the HDR compression processing unit 316 and the detail generation unit 322 (arrow 350).

The HDR compression processing unit 316 may be configured similarly to the HDR compression processing unit 113 of FIG. 1, and may perform processing similar to that of FIG. 1. The HDR compression processing unit 316 may include a conversion table 121 and a combination unit 122, and may convert the illumination component supplied from the illumination separation filter 315 into a combination coefficient using a certain conversion table, and may weight the underexposed image, the optimum-exposure image, and the overexposed image using the combination coefficient to add the weighted images to each other. Thus, the HDR compression processing unit 316 may generate an image (HDR compressed image) with an appropriate tonal range, in which the tonal range of a luminance signal is compressed and combined such that deterioration of the image quality does not occur, from the underexposed image, the optimum-exposure image, and the overexposed image. The HDR compression processing unit 316 may supply the generated HDR compressed image (image with the tonal range of the luminance signal compressed) to the beautification processing unit 317 (arrow 351).

The beautification processing unit 317 may be configured similarly to the beautification processing unit 114 of FIG. 1 and may perform processing similar to that of FIG. 1. The beautification processing unit 317 may include a region detection unit 131 and a beautification filter 132, detect a target region from the supplied optimum-exposure image, and perform beautification processing for a beautification filter operation with respect to the target region. The beautification processing unit 317 may supply the beautified HDR compressed image to the detail emphasizing unit 323 (arrow 352).

The control unit 321 may set a detail emphasis amount that is an emphasis amount of the reflectance component of the HDR compressed image for giving a painterly visual effect. The detail emphasis amount may be a gain that excessively emphasizes the detail component of the beautified HDR compressed image. The control unit 321 may supply the detail emphasis amount to the detail generating unit 322 (arrow 345).

For example, the control unit 321 may include a storage unit to store a preset detail emphasis amount, and may supply the preset detail emphasis amount to the detail generating unit 322. Also, the control unit 321 may include an input unit, and may supply a detail emphasis amount input from the outside to the detail generating unit 322. For example, the control unit 321 may include a reception unit configured to receive an instruction from a user, and may supply a detail emphasis amount set by a user to the detail generating unit 322. The control unit 321 may include an operation unit, and may calculate a detail emphasis amount on the basis of information input from the outside or by a user to supply the detail emphasis amount to the detail generating unit 322.

For example, when giving a painterly visual effect to the beautified HDR compressed image, the control unit 321 may set the detail emphasis amount to a large value (for example, sufficiently larger than 1). On the other hand, when not giving a painterly visual effect to the beautified HDR compressed image, the control unit 321 may set the detail emphasis amount to a small value (for example, approximately 1).

The detail generating unit 322 may extract a reflectance component (also referred to as detail component or high frequency component) of the luminance component of the optimum-exposure image using the luminance component of the optimum-exposure image supplied from the luminance component extracting unit 314 and the illumination component of the luminance component of the optimum-exposure image supplied from the illumination separation filter 315.

Also, the detail generating unit 322 may emphasize the extracted reflectance component with the detail emphasis amount supplied from the control unit 321, and may generate an emphasized detail component. The detail generating unit 322 may supply the emphasized detail component to the detail emphasizing unit 323 (arrow 353).

The detail emphasizing unit 323 may combine (multiply or add) the emphasized detail component supplied from the detail generating unit 322 with respect to the beautified HDR compressed image supplied from the beautification processing unit 317. When the detail emphasis amount for emphasizing the detail component is large, the detail emphasizing unit 323 may give a painterly visual effect by excessively emphasizing the detail of the beautified HDR compressed image supplied from the beautification processing unit 317 through the above combining processing. On the other hand, when the emphasis amount for emphasizing the detail component is small, the detail emphasizing unit 323 may output the beautified HDR compressed image supplied from the beautification processing unit 317 without excessively emphasizing the detail.

The detail emphasizing unit 323 may output a painterly HDR compressed image that has undergone such combining processing (arrow 354).

The painterly HDR image data output from the detail emphasizing unit 323 may undergo a process such as additional bit number compression.

Also, the storage unit 319 may store various kinds of image data exchanged between the processing units. The processing units described above may exchange data such as an underexposed image, an optimum-exposure image, an overexposed image, an illumination component, a detail component, a beautification-processed image, an HDR compressed image, and a painterly HDR compressed image through the storage unit 319.

Thus, the image processing apparatus 300 may easily combine a plurality of images with different exposure conditions to generate an image with an appropriate tonal range and simultaneously perform beautification processing on the image to improve the visual image quality in a desired region and give a painterly visual effect to the image. In other words, the image processing apparatus 300 can give more various effects to the image.

Also, in the image processing apparatus 300, when the detail component is not excessively emphasized (painterly visual effect not given), the beautification processing by the beautification processing unit 313 may be omitted according to the selection of the selection unit 312, and only the beautification processing by the beautification processing unit 317 may be performed. In this case, the processing result may be similar to that of the image processing apparatus 100.

On the other hand, in the image processing apparatus 300, when the detail component is excessively emphasized (painterly visual effect given), beautification processing by both the beautification processing unit 313 and the beautification processing unit 317 may be performed according to the selection of the selection unit 312.

In this case, the detail component generated by the detail generating unit 322 may be generated using the image beautified by the beautification processing unit 313. In other words, the beautification processing unit 313 may perform beautification processing on the detail component to be emphasized before the emphasis of the detail component. The detail to be suppressed by the beautification processing may be suppressed before emphasis is applied.

Accordingly, the image processing apparatus 300 may emphasize only a necessary detail component view to improve the texture compared to the original without emphasizing components such as spots or wrinkles of skin and noise in skyey region that need not to be emphasized. In other words, the image processing apparatus 300 can give a painterly visual effect to an image while suppressing the reduction of the image quality.

In this case, the reduction of the beautification processing effect by the detail emphasis can be suppressed by performing the beautification processing before the detail emphasis.

In this case, the illumination component supplied to the HDR compression processing unit 316 may undergo the beautification processing. However, since the illumination component is a lowpass component, the illumination component may be insignificantly influenced by the beautification processing. Also, since the illumination component is used merely to calculate the combination coefficient, the presence or absence of the beautification processing may not affect the processing result. In other words, the illumination component of the luminance component may be extracted from an unbeautified optimum-exposure image, and may be supplied to the HDR compression processing unit 316 to allow the illumination component supplied from the HDR compression processing unit 316 not to be beautified. Although it has been described above that the illumination component or the detail component is calculated from the optimum-exposure image, embodiments are not limited thereto. For example, the illumination component or the detail component may be calculated from the underexposed image or the overexposed image. For example, when the illumination component or the detail component is calculated from the underexposed image, the input of the selection unit 312 may become the arrow 341. On the other hand, when the illumination component or the detail component is calculated from the overexposed image, the input of the selection unit 312 may become the arrow 343

The detail emphasis amount may be arbitrary. However, when the detail emphasis amount increases, for example, by a factor of two, four, and eight, the detail may be further emphasized to strengthen the painterly visual effect given to the image.

When giving a stronger painterly visual effect to the image, the control unit 321 may set a large value to the detail emphasis amount. Also, when not giving a stronger painterly visual effect to the image, the control unit 321 may set a small value (e.g., 1) to the detail emphasis amount. In other words, the control unit 321 can control whether to fully perform the HDR compression processing on a subject or to give a painterly visual effect by controlling the magnitude of the detail emphasis amount.

When the illumination component and the reflectance component are separated using linear smoothing filter processing, a phenomenon called HALO (a halo-like artifact occurring around a contour portion) may occur around the contour, and the image quality may become undesirable (image quality is visually deteriorated). Accordingly, an edge preserving smoothing filter may be used as the illumination separation filter 315. Examples of edge preserving smoothing filters may include a bilateral filter and a method disclosed in International Patent Application Publication No. WO2009/072537 (corresponding US Patent Application No. US2010/0310189)

Also, the control unit 321 may control the magnitude of the emphasis amount as well as switching of whether to set the detail emphasis amount to a large value or a small value.

For example, the control unit 321 may be allowed to control the magnitude of the detail emphasis amount according to the luminance or location.

For example, the detail emphasizing unit 323 may emphasize the detail components with respect to all or only some regions of the image. For example, when an image is composed from a plurality of images like picture-in-picture, a painterly visual effect may be given only to some images (i.e., some regions). In this case, the control unit 321 may set a region to be amplified based on arbitrary information such as a user's instruction, an instruction from the outside, or image analysis results, and the detail generating unit 322 may emphasize the detail component with respect to only the set region. Also, the region may be predetermined.

Similarly to the beautification processing, the beautification processing unit 313 may control the strength of the beautification filter according to the luminance, magnitude, or location of a target.

Although the beautification processing has been described as an example, the processing performed in the beautification processing units 313 and 317 may include any processing that affects a high frequency component in addition to the beautification processing. For example, a process of reducing unnecessary components among the high frequency component may also be performed. Only a desired portion of the high frequency component may be specified and processed. An algorithm for performing smoothing processing on a specific region using a subject detection result may be applied. More specifically, processes of blurring a distant subject or reducing noise in skyey region may be performed.

[Detail Generating Unit]

Figure 4:
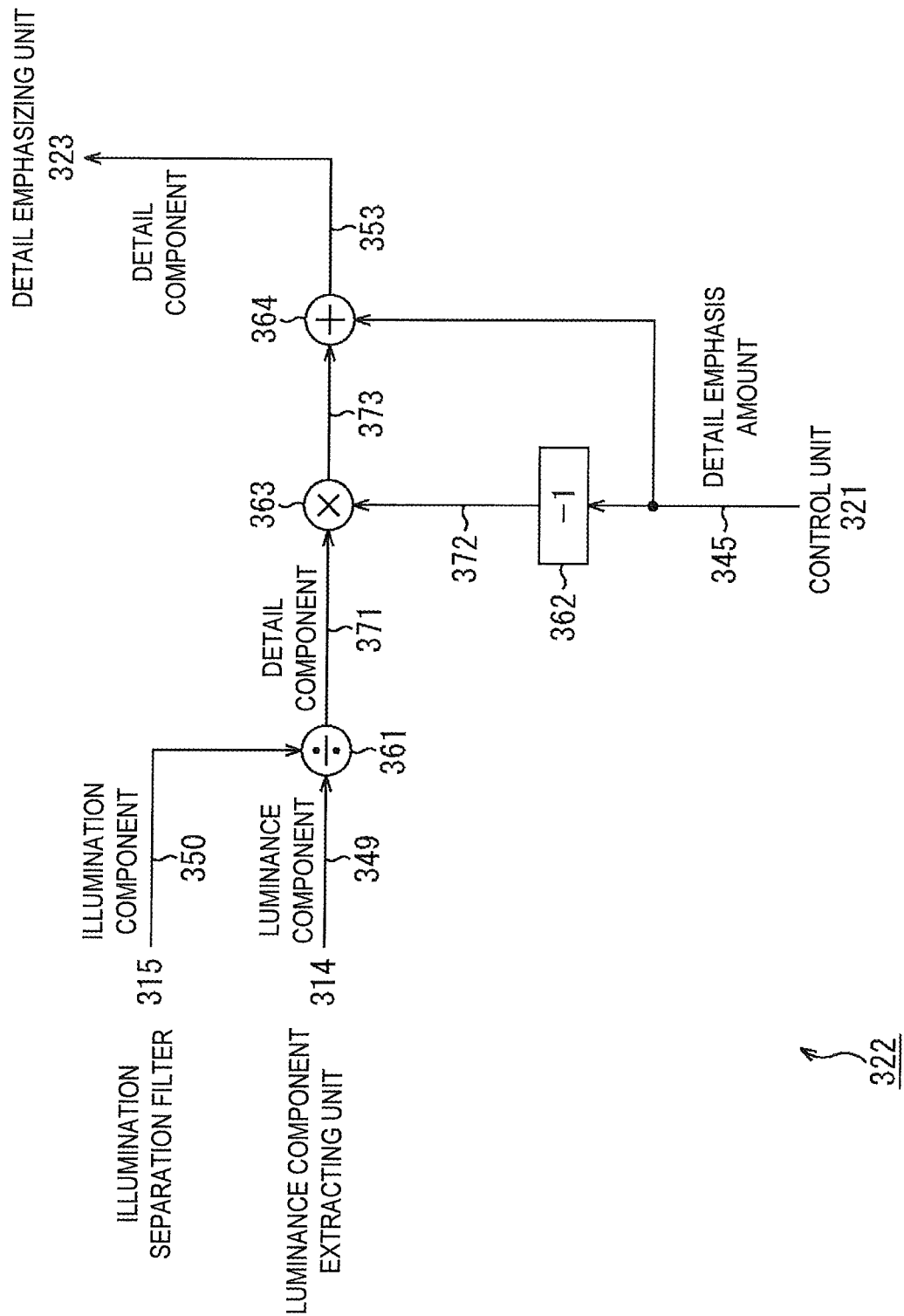
FIG. 4 is a block diagram illustrating an exemplary main configuration of a detail generating unit.

FIG. 4 is a block diagram illustrating an exemplary configuration of the detail generating unit 322. As shown in FIG. 4, the detail generating unit 322 may include a division unit 361, a subtraction unit 362, a multiplication unit 363, and an addition unit 364.

The division unit 361 may extract the detail component by dividing the luminance component (arrow 349) supplied from the luminance component extracting unit 314 by the illumination component (arrow 350) supplied from the illumination separation filter 315. The division unit 361 may supply the extracted detail component to the multiplication unit 363 (arrow 371).

The subtraction unit 362 may subtract a value "1" from the detail emphasis amount supplied from the control unit 321 in order to correct a portion in which a detail gain as a standard is automatically involved. The subtraction unit 362 may supply the detail emphasis amount from which the value "1" is subtracted to the multiplication unit 363 (arrow 372).

The multiplication unit 363 may multiply the detail component supplied from the division unit 361 by the detail emphasis amount supplied from the subtraction unit 362, and may supply the multiplication result to the addition unit 364 (arrow 373).

The addition unit 364 may add the detail emphasis amount (arrow 345) supplied from the control unit 321 to the multiplication result of the detail component and the detail emphasis amount from which the value "1" is subtracted, supplied from the multiplication unit 363. The addition unit 364 may supply the addition result, i.e., the excessively emphasized detail component, to the detail emphasizing unit 323 (arrow 353).

Also, when the signal precision is rounded during the output of the smoothing filter processing for the purpose of memory reduction, it is desirable to extract the detail component from the signal (luminance component and illumination component) before the rounding. This is because the operation precision is important in the calculation of the detail component.

[Flow of Image Processing]

An exemplary image processing flow will be described with reference to the flowchart of FIG. 5.

In step S301, the image processing apparatus 300 may acquire an underexposed image, an optimum-exposure image, and an overexposed image, and may store the obtained images in the storage unit 319.

In step S302, the control units 311 and 321 may determine whether or not to give a painterly effect to an image on which HDR compression processing is performed. If it is determined that the painterly effect is given to the image, the control units 311 and 321 may progress the processing to step S303. In step S303, the control unit 321 may set a large value (sufficiently larger value than 1) to the detail emphasis amount so as to excessively amplify the detail component. In step S304, the control unit 311 may control the selection unit 312 to perform the beautification processing. The beautification processing unit 313 may read an optimum-exposure image from the storage unit 319 according to the control of the control unit 311, and may perform beautification processing on the optimum-exposure image. When the beautification processing is completed, the beautification processing unit 313 may progress the processing to step S306.

In step S302, if it is determined that the painterly effect is not given to the image, the control units 311 and 321 may progress the processing to step S305. In step S305, the control unit 321 may set a small value (value of approximately 1) to the detail emphasis amount. Also, the control unit 311 may control the selection unit 312 so as not to perform the beautification processing. When the processing of step S305 is completed, the control unit 321 may progress the processing to step S306.

In step S306, the luminance component extracting unit 314 may read the optimum-exposure image from the storage unit 319, and may extract the luminance component from the read optimum-exposure image. The storage unit 319 may store the extracted luminance component. Also, since the luminance component may be a first component of the optimum-exposure image, the storage of the luminance component may be omitted. In step S307, the illumination separation filter 315 may read the luminance component from the storage unit 319, and may extract the illumination component from the read luminance component. The storage unit 319 may store the extracted illumination component.

In step S308, the HDR compression processing unit 316 may read the underexposed image, the optimum-exposure image, the overexposed image, and the illumination component from the storage unit 319, and may generate an HDR compressed image using the underexposed image, the optimum-exposure image, the overexposed image, and the illumination component.

In step S309, the beautification processing unit 316 may read the HDR compressed image generated in step S308 from the storage unit 319, and may perform beautification processing on the HDR compressed image.

In step S310, the painterly processing unit 318 may read the beautification-processed image (beautification processing result) generated in step S309, the luminance component of the optimum-exposure image, and the illumination component of the luminance component from the storage unit 319, and may emphasize detail of the beautification-processed image using the beautification-processed image, the luminance component of the optimum-exposure image, and the illumination component extracted from the luminance component. Thus, the HDR image in which the detail is emphasized may be output to the outside of the image processing apparatus 300, and may be stored in the storage unit 319 provided in the image processing apparatus 300.

[Beautification Processing]

Hereinafter, an exemplary beautification processing flow performed in step S304 of FIG. 5 will be described with reference to the flowchart of FIG. 6.

When the beautification processing starts, in step S321, the region detecting unit 131 of the beautification processing unit 313 may detect a target region of the optimum-exposure image read from the storage unit 319. In step S322, the beautification filter 132 of the beautification processing unit 132 may acquire an unprocessed pixel of the optimum-exposure image read from the storage unit 319.

In step S323, the beautification filter 132 may determine whether or not the pixel acquired in step S322 is a pixel of the target region, based on the target region detection result performed in step S321. If it is determined that the acquired pixel is a pixel of the target region, the beautification filter 132 may progress the processing to step S324 to perform a beautification filter operation (filter processing) on the acquired pixel.

When the beautification filter operation is performed, the beautification filter 132 may progress the processing to step S325.

Also, in step S323, if it is determined that the acquired pixel is not a pixel of the target region, the beautification filter 132 may omit the processing of step S324 and progress the processing to step S325.

In step S325, the beautification filter 132 may determine whether all pixels of the optimum-exposure image are processed. If it is determined that there is an unprocessed pixel, the processing may return to step S322, and the subsequent processing may be repeated.

On the other hand, in step S325, if it is determined that all pixels of the optimum-exposure are processed, the beautification filter 132 may progress the processing to step S326.

In step S326, the storage unit 319 may store the beautification-processed image that is beautified through the appropriate beautification filter operation. When the processing of step S326 is completed, the processing may return to FIG. 5.

Figure 5:
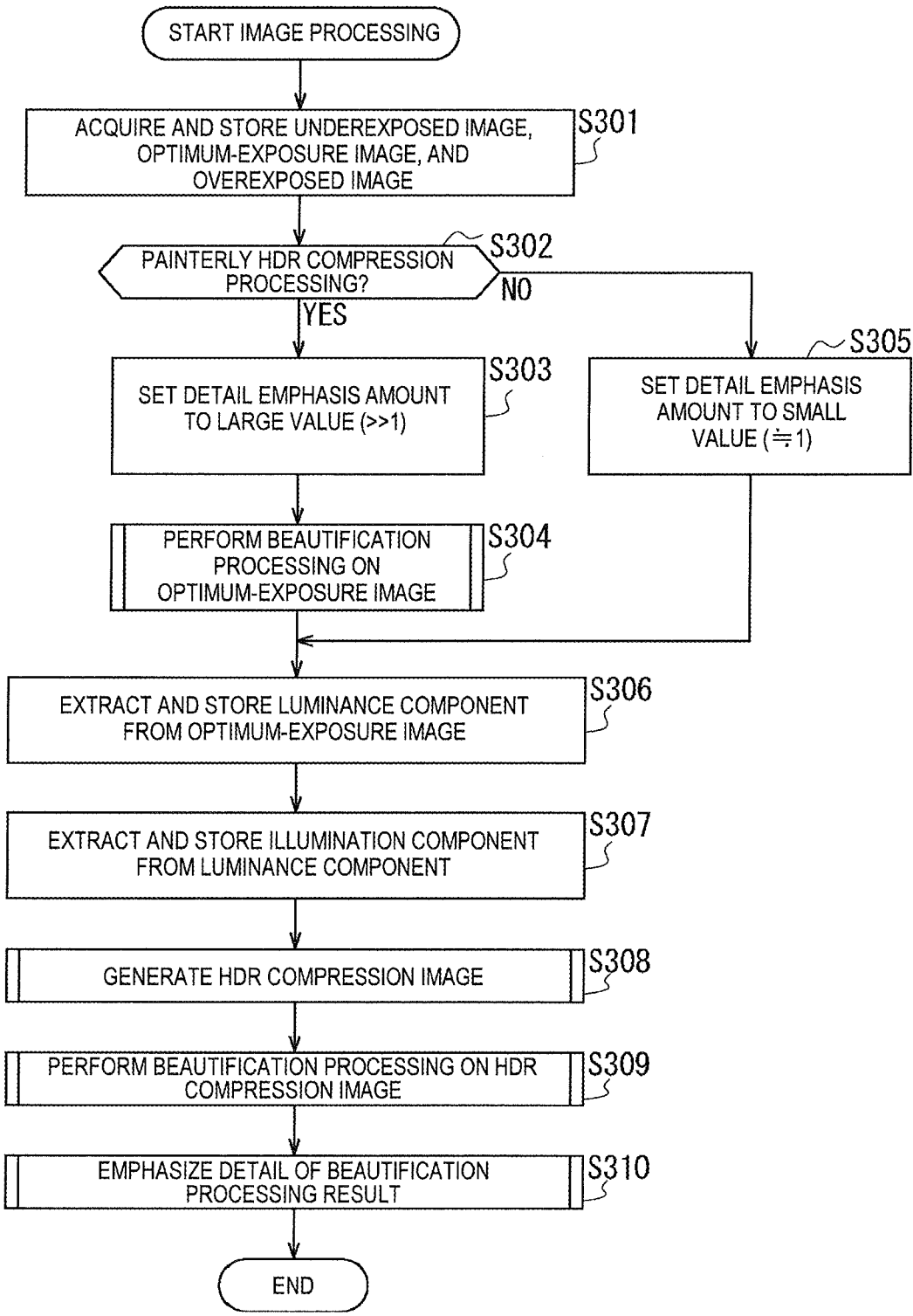
FIG. 5 is a flowchart illustrating an exemplary image processing flow.
Figure 6:
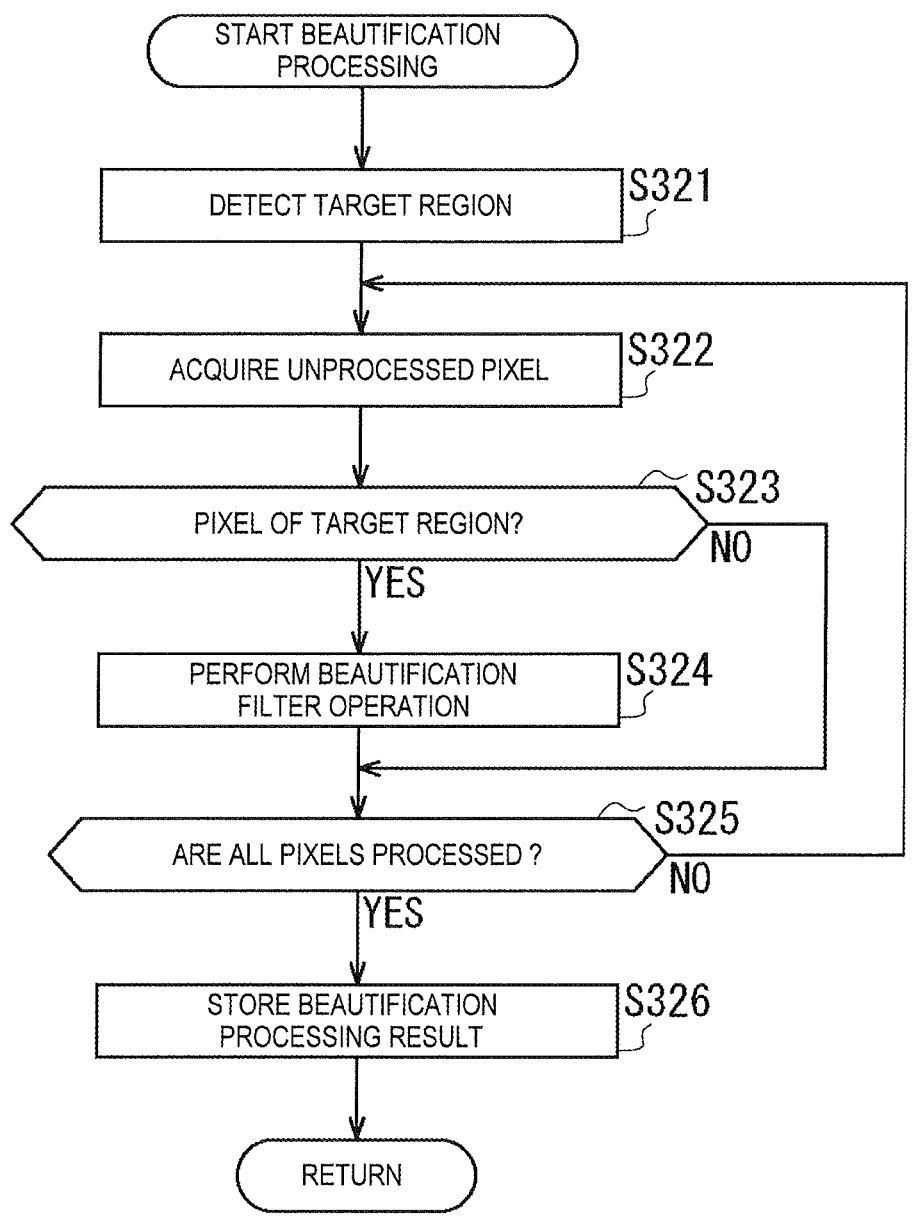
FIG. 6 is a flowchart illustrating an exemplary beautification processing flow.

The beautification processing performed in step S309 of FIG. 5 may be performed similarly to that of step S304 except that images to be processed are different. In other words, since the beautification processing performed in step S309 can be described with reference to the flowchart of FIG. 6, a detailed description thereof will be omitted herein.

[HDR Compression Processing]

Figure 7:
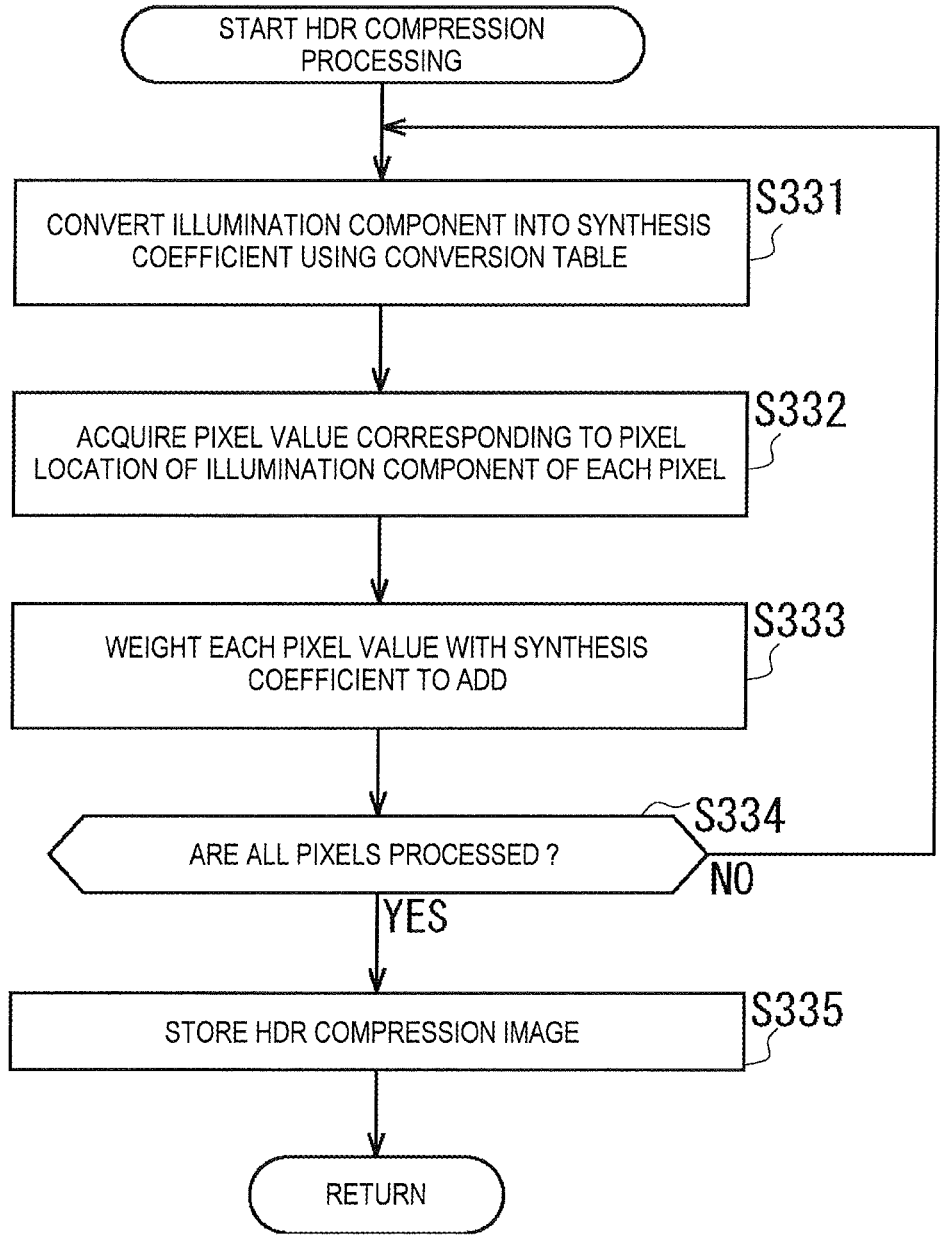
FIG. 7 is flow chart illustrating an exemplary HDR compression processing flow.

Hereinafter, an exemplary HDR compression processing flow performed in step S308 of FIG. 5 will be described with reference to the flowchart of FIG. 7.

In step S331, the conversion table 121 of the HDR compression processing unit 316 may convert values of the target pixels of the illumination component read from the storage unit 319 into a combination coefficient using a previously prepared conversion table.

In step S332, the combination unit 122 of the HDR compression processing unit 316 may acquire pixel values corresponding to pixel locations of the illumination component read from the storage unit 319 with respect to the underexposed image, the optimum-exposure image, and the overexposed image read from the storage unit 319.

In step S333, the combination unit 122 may weight the pixel values of each image acquired in step S332 using the combination coefficient obtained in step S331, and add them to each other. The addition result may become a combination result of each image. Accordingly, the HDR compressed image in which the respective images are combined may be generated by performing the above processing on all pixels.

In step S334, the combination unit 122 may determine whether or not all pixels are processed. If there is an unprocessed pixel, the processing may progress to step S331, and the subsequent processing may be repeated.

In step S334, if it is determined that all pixels are processed, the combination unit 122 may progress the processing to step S335.

In step S335, the storage 319 may store the HDR compressed image that is generated as above. When the processing of step S335 is completed, the processing may return to FIG. 5.

[Detail Emphasis Processing]

Figure 8:
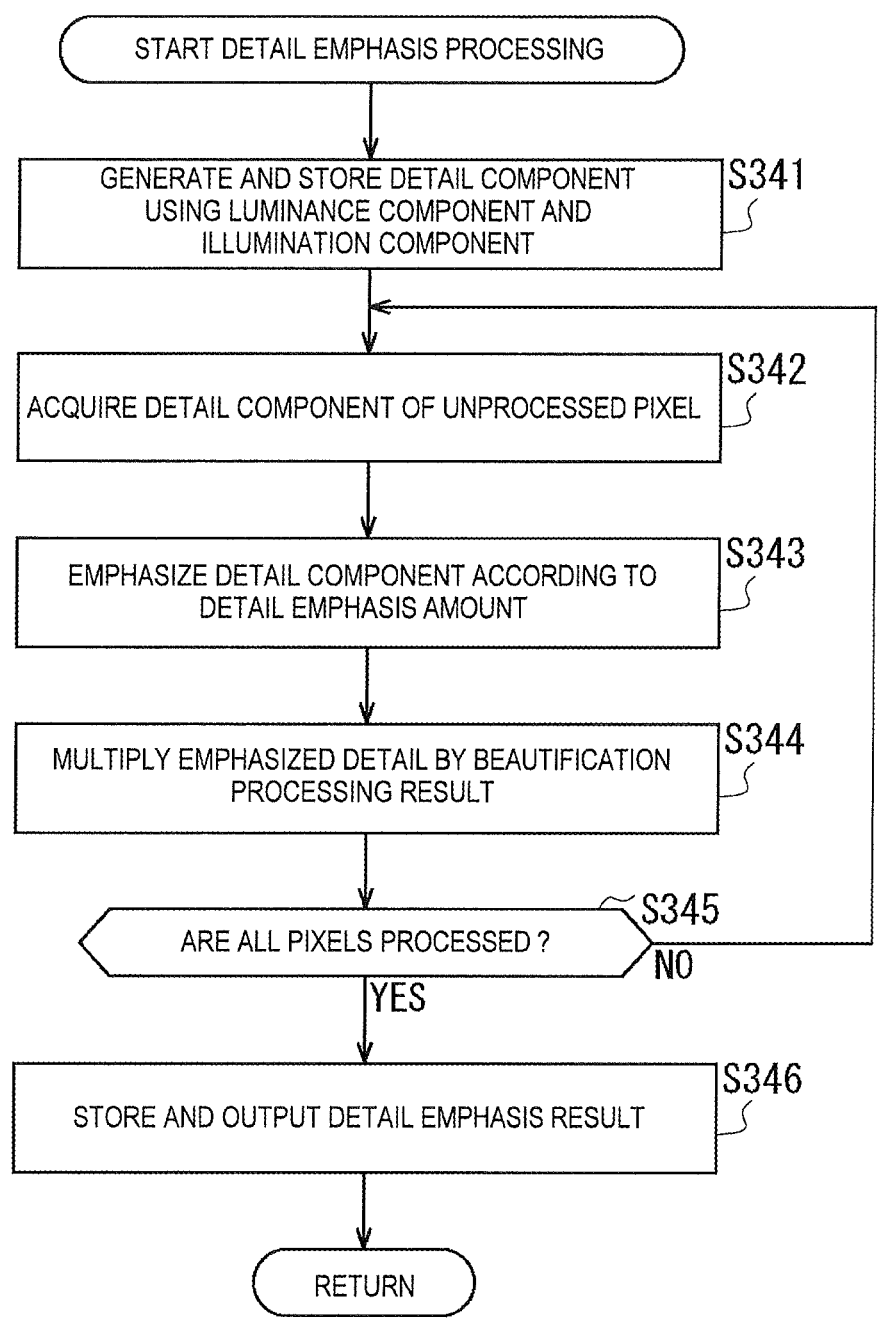
FIG. 8 is a flowchart illustrating an exemplary detail emphasis processing flow.

Hereinafter, an exemplary detail emphasis processing flow performed in step S310 of FIG. 5 will be described with reference to the flowchart of FIG. 8.

In step S341, the detail generating unit 322 may generate a detail component using the illumination component and the luminance component read from the storage unit 319. The storage unit 319 may store the detail component.

In step S342, the detail generating unit 322 may read the detail component from the storage unit 319 with respect to an unprocessed pixel. In step S343, the detail generating unit 322 may emphasize the detail component according to the detail emphasis amount set by the control unit 321.

In step S344, the detail emphasizing unit 323 may read the values of pixels corresponding to the beautification-processed image that is a result of the beautification processing from the storage unit 319, and may combine (multiply or add) the detail component emphasized by the processing of step S343 with the pixel values. The combination result may be a result of the detail emphasis. The detail component of the beautification-processed image may be emphasized by the combining all pixels to generate a painterly HDR compressed image that is beautified.

In step S345, the detail generating unit 322 may determine whether or not all pixels of the luminance component or the illumination component are processed. If it is determined there is an unprocessed pixel, the processing may return to step S342, and the subsequent processing may be repeated.

In step S345, if it is determined that all pixels are processed, the detail generating unit 322 may progress the processing to step S346.

In step S346, the storage unit 319 may store the detail emphasis result, i.e., the painterly HDR compressed image that is beautified. Also, the detail emphasizing unit 323 may output the beautified painterly HDR compressed image to the outside of the image processing apparatus 300.

When the processing of step S346 is completed, the processing may return to FIG. 5.

Thus, the image processing apparatus 300 may easily combine a plurality of images with different exposure conditions to generate an image with an appropriate tonal range and simultaneously perform beautification processing on the image to improve the visual image quality in a desired region and give a painterly visual effect to the image. In other words, the image processing apparatus 300 can give more various effects to the image.

An exemplary use change of the storage unit 319 will be described with reference to FIG. 9. In FIG. 9, the horizontal axis represents the processing flow, and the vertical axis represents the size (capacity) of a storage region used. Each square illustrates image data stored in the storage unit 319.

Figure 9A:
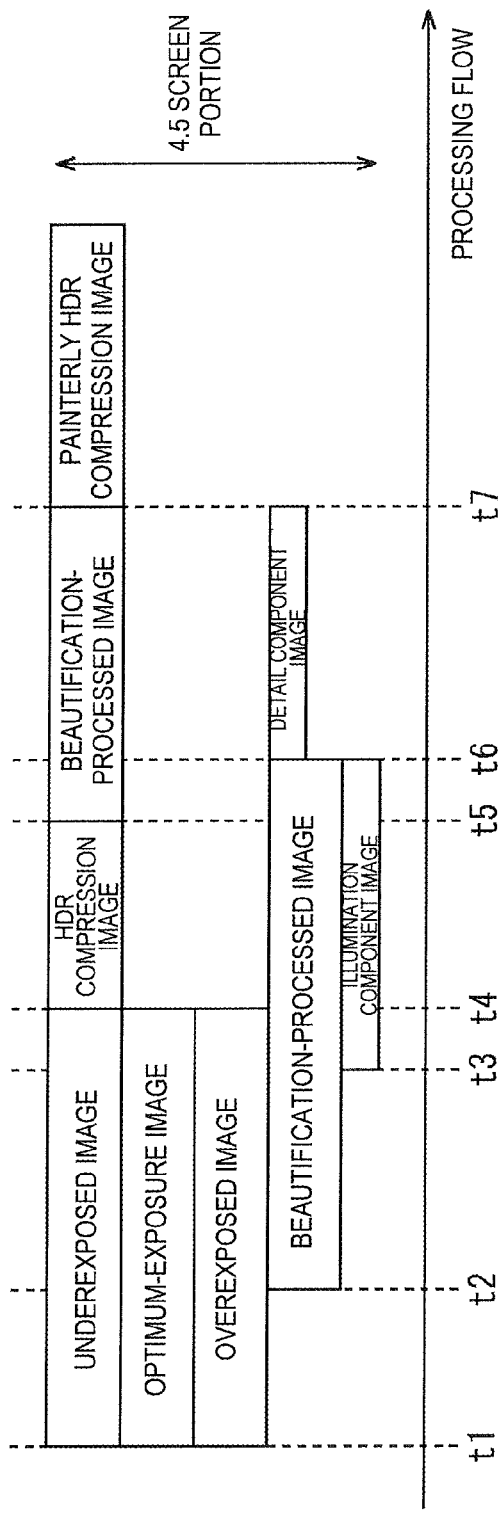
FIGS. 9A and 9B show diagrams illustrating exemplary changes of a used amount of memory.
Figure 9B:
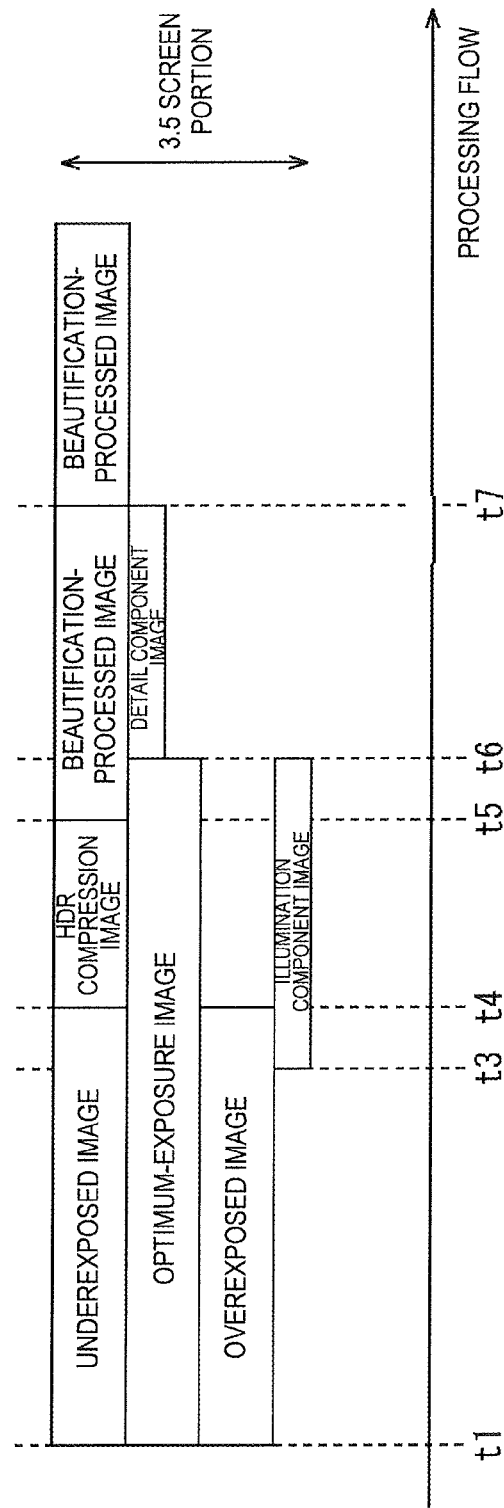

FIG. 9A illustrates an exemplary use change of the storage unit 319 in the image processing apparatus 300 of FIG. 3 when detail is excessively emphasized and a painterly visual effect is given to an image. Also, FIG. 9B illustrates another exemplary use change of the storage unit 319 in the image processing apparatus 300 of FIG. 3 when the detail is not emphasized and the painterly visual effect is not given to the image.

As shown in FIG. 9A, when the painterly visual effect is given to the image, a storage region of 4.5 times of a memory size of an image may be required. On the other hand, as shown in FIG. 9B, when the painterly visual effect is not given to the image, a storage region of 3.5 times of a memory size of an image may be required.

4. Fourth Embodiment

Image Processing Apparatus

In the image processing apparatus 300 described above, when the painterly visual effect is given to the image, the beautification processing may be performed twice. Accordingly, the throughput and the process time may increase each time the beautification processing is performed. Also, as shown in FIG. 9A, a used amount of the storage unit 319 may increase.

Accordingly, in order to reduce the load of the beautification processing, even when the painterly visual effect is given to the image, the beautification processing may be completed at once.

Figure 10:
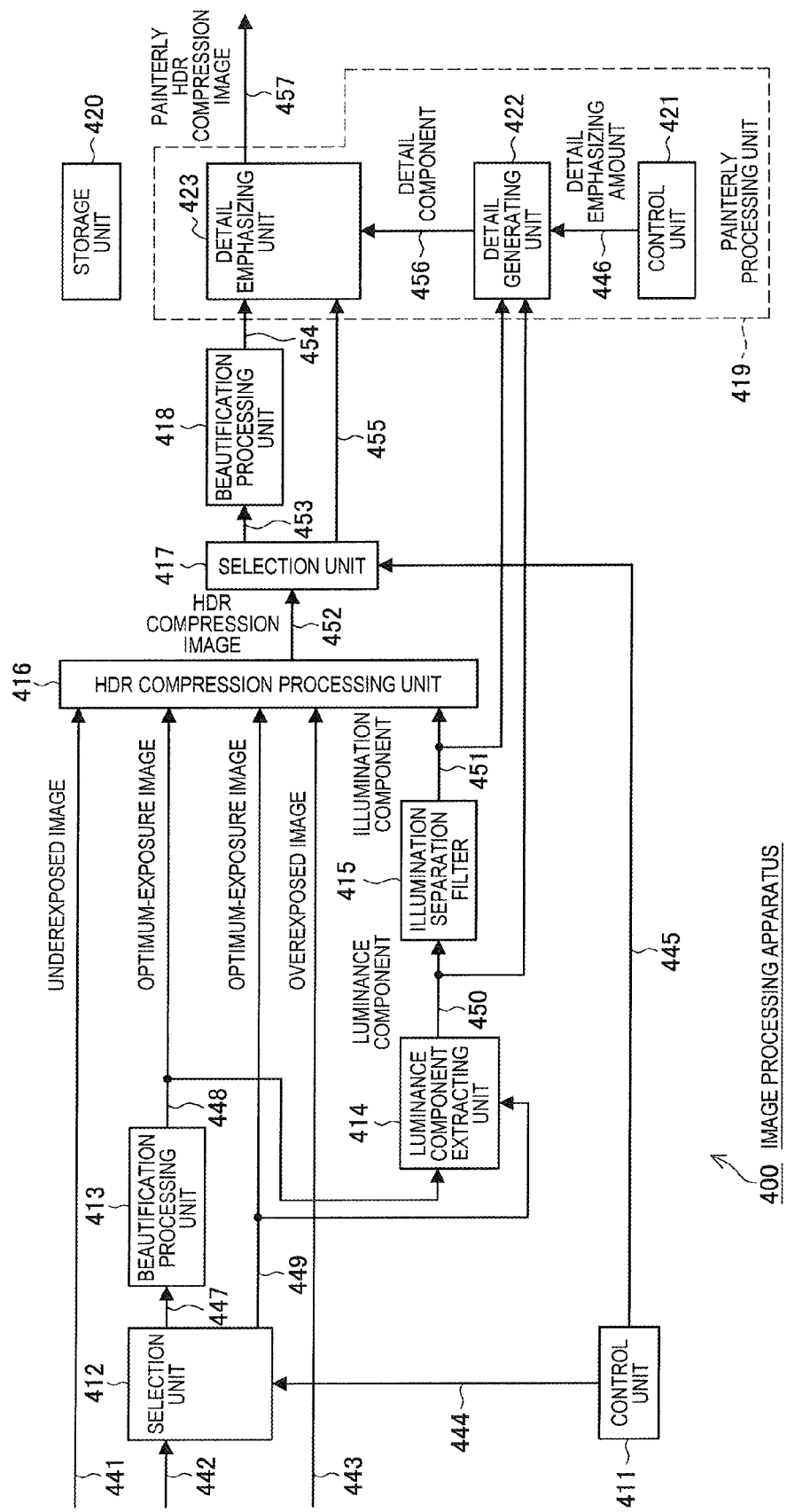
FIG. 10 is a block diagram illustrating another exemplary configuration of an image processing apparatus.

FIG. 10 is a block diagram illustrating an exemplary main configuration of an image processing apparatus used in the above case.

An image processing apparatus 400 shown in FIG. 10 may be substantially similar to the image processing apparatus 300. The image processing apparatus 400 may perform HDR processing, beautification processing, and painterly processing on an image.

The image processing apparatus 400 shown in FIG. 10 may include a control unit 411, a selection unit 412, a beautification processing unit 413, a luminance component extracting unit 414, an illumination separation filter 415, an HDR compression processing unit 416, a selection unit 417, a beautification processing unit 418, a painterly processing unit 419, and a storage unit 420.

Also, the painterly processing unit 419 may include a control unit 421, a detail generating unit 422, and a detail emphasizing unit 423.

Similarly to the control unit 311, the control unit 411 may control the selection unit 412, and may control whether or not to perform beautification processing in the beautification processing unit 413. The control unit 411 may control the selection unit 417, and may control whether to perform the beautification processing in the beautification processing unit 418.

For example, the control unit 411 may control the beautification processing unit 413 to perform beautification processing and control the beautification processing unit 418 not to perform beautification processing when a painterly visual effect is given to an image. On the other hand, the control unit 411 may control the beautification processing unit 418 to perform the beautification processing and control the beautification processing unit 413 not to perform the beautification processing when the painterly visual effect is not given to the image.

Similarly to the selection unit 312, the selection unit 412 may select a supply destination of an optimum-exposure image according to the control of the control unit 411. The selection unit 412 may select either the beautification processing unit 413 or one of the luminance component extracting unit 414 and the HDR compression processing unit 416 as the supply destination of the optimum-exposure image.

The beautification processing unit 413 may be configured similarly to the beautification processing unit 313, and may perform the processing similar to that of the beautification processing unit 313. However, the beautification processing unit 413 may supply a beautification-processed image acquired by performing the beautification processing on the optimum-exposure image supplied from the selection unit 412 to the luminance component extracting unit 414 and the HDR compression processing unit 416.

In the image processing apparatus 400, the beautification processing may be performed on the optimum-exposure image used to generate the HDR compressed image as well as the optimum-exposure image used to generate the detail component.

The luminance component extracting unit 414 may be configured similarly to the luminance component extracting unit 314, and may perform the processing similar to that of the luminance component extracting unit 314. The illumination separation filter 415 may be configured similarly to the illumination separation filter 315, and may perform the processing similar to that of the illumination separation filter 315.

The HDR compression processing unit 416 may be configured similarly to the HDR compression processing unit 316, and may perform the processing similar to that of the HDR compression processing unit 316. However, the optimum-exposure image that the HDR compression processing unit 416 combines with the underexposed image and the overexposed image input into the image processing apparatus 400 may be an optimum-exposure image beautified by the beautification processing unit 413 or an optimum-exposure image supplied from the selection unit 412 that has not been beautified in the beautified processing unit 413. When a painterly visual effect is given to the image, the beautified optimum-exposure image (beautification-processed image) may be employed as the optimum-exposure image that is combined.

The HDR compression processing unit 416 may supply the HDR compressed image, which is acquired by combining the underexposed image, the overexposed image, and the optimum-exposure image based on the illumination component, to the selection unit 417.

The selection unit 417 may select one of the beautification processing unit 418 and the detail emphasizing unit 423 as a supply destination of the HDR compressed image according to the control of the control unit 411.

The beautification processing unit 418 may be configured similarly to the beautification processing unit 317, and may perform the processing similar to that of the beautification processing unit 317. The beautification processing unit 418 may perform the beautification processing on the HDR compressed image only when a painterly visual effect is not given to the image, and may supply the beautification-processed image that is a beautification processing result to the detail emphasizing unit 423.

The control unit 421 may be configured similarly to the control unit 321, and may perform the processing similar to that of the control unit 321. The detail generating unit 422 may be configured similarly to the detail generating unit 322, and may perform the processing similar to that of the detail generating unit 322. The detail emphasizing unit 423 may be configured similarly to the detail emphasizing unit 323, and may perform the processing similar to that of the detail emphasizing unit 323.

Similarly to the storage unit 319, the storage unit 420 may store various kinds of image data exchanged between the respective processing units. The underexposed image, the optimum-exposure image, the overexposed image, the beautification-processed image, the illumination component, the HDR compressed image, and the painterly HDR compressed image may be exchanged through the storage 420.

As described above, in the image processing apparatus 400, when the painterly visual effect is given to the image, only the beautification processing unit 413 may perform the beautification processing. On the other hand, when the painterly visual effect is not given to the image, only the beautification processing unit 418 may perform the beautification processing. Accordingly, whether the painterly visual effect is or is not given to the image, the beautification processing may be performed only once, thereby suppressing the load (throughput or process time). Also, a used amount of the storage unit 420 may be reduced.

Also, when the painterly visual effect is not given to the image, the beautification processing may be performed only in the beautification processing unit 418. Accordingly, the beautification processing may be performed similarly to that of the image processing apparatus 300. However, when the painterly visual effect is given to the image, the beautification processing may be performed only in the beautification processing unit 413. Accordingly, the beautification processing may be performed differently from that of the image processing apparatus 300.

In the image processing apparatus 400, the HDR compressed image may be generated by performing the beautification processing only on the necessary optimum-exposure image, not the underexposed image or the overexposed image. Accordingly, the processing result may be different from the image processing apparatus 300 where the beautification processing is performed after the generation of the HDR compressed image.

However, in an image to which the painterly visual effect is given to excessively emphasize the detail component, the emphasized detail component may be visually most remarkable (dominant). Accordingly, in the emphasized detail component, when the beautification processing is similarly performed, a visual effect may be insignificant.

In other words, the painterly HDR compressed image generated by the image processing apparatus 400 may be visually similar to the painterly HDR compressed image generated by the image processing apparatus 300.

Thus, the image processing apparatus 400 may easily combine a plurality of images with different exposure conditions to generate an image with an appropriate tonal range and simultaneously perform beautification processing on the image to improve the visual image quality in a desired region and give a painterly visual effect to the image. In other words, the image processing apparatus 400 can give more various effects to the image. In this case, the calculation of the illumination component or the detail component and the beautification processing of the beautification processing unit 413 may be performed from the underexposed image or the overexposed image as well as the optimum-exposure image. Accordingly, the input of the selection unit 412 may become the arrow 441 or the arrow 443. In this case, the optimum-exposure image (arrow 442) may be input to the HDR compression processing unit 416.

[Flow of Image Processing]

Figure 11:
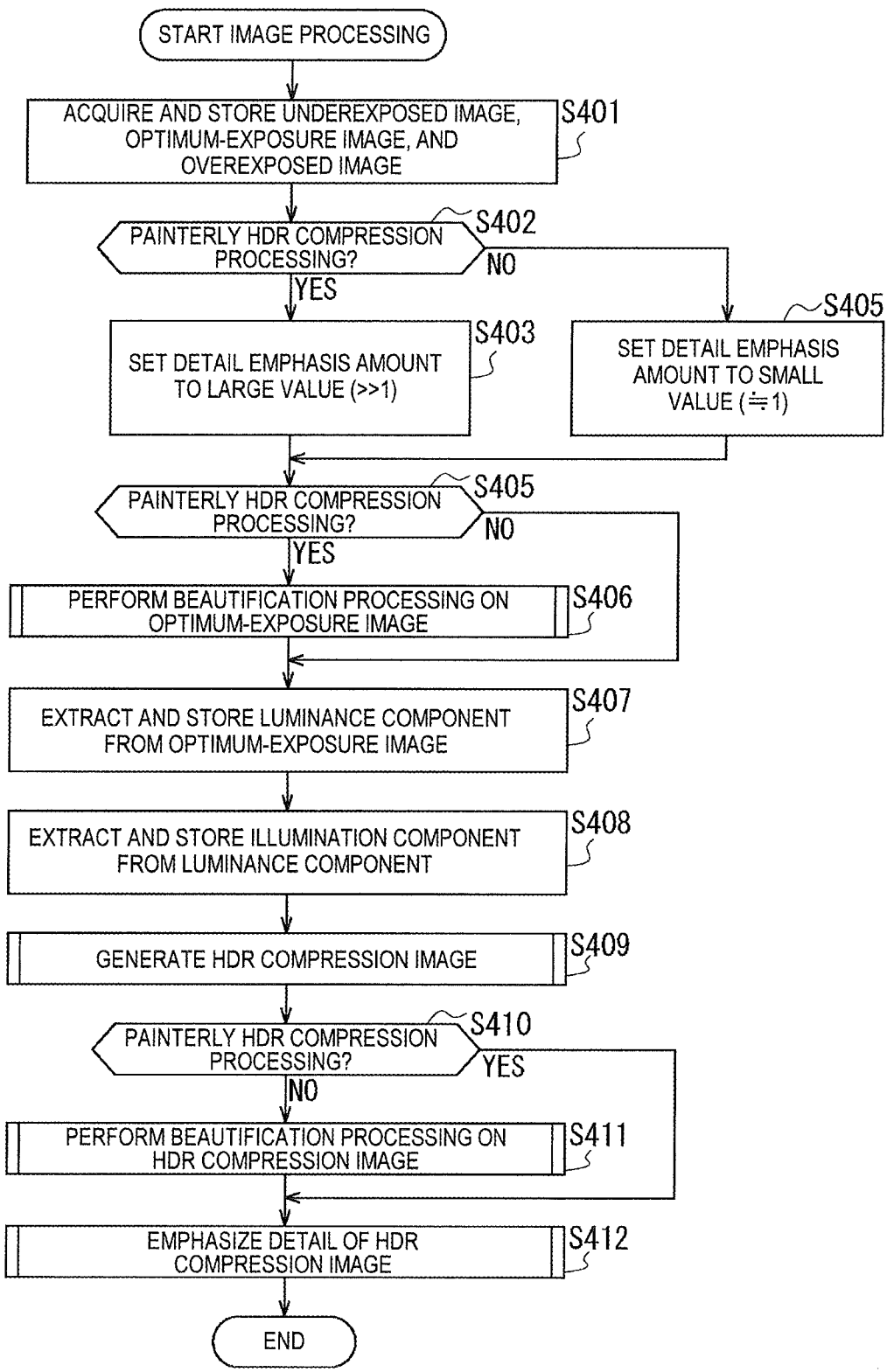
FIG. 11 is a flowchart illustrating another exemplary image processing flow.

An exemplary image processing flow will be described with reference to the flowchart of FIG. 11.

In step S401, the image processing apparatus 400 may acquire an underexposed image, an optimum-exposure image, and an overexposed image, and may store the acquired image in the storage unit 420.

In step S402, the control unit 421 may determine whether or not to give a painterly effect to an image on which HDR compression processing is performed. If it is determined that the painterly effect is given to the image, the control unit 421 may progress the processing to step S403. In step S403, the control unit 421 may set a large value (sufficiently larger value than 1) to the detail emphasis amount so as to excessively amplify the detail component.

In step S402, if it is determined that the painterly effect is not given to the image, the control unit 421 may progress the processing to step S404. In step S404, the control unit 421 may set a small value (value of approximately 1) to the detail emphasis amount. When the processing of step S403 or S404 is completed, the control unit 421 may progress the processing to step S405.

In step S405, the control unit 411 may determine whether or not to give a painterly effect to the image on which the HDR compression processing is performed. If it is determined that the painterly effect is given to the image, the control unit 411 may control the selection unit 412 to supply the optimum-exposure image to the beautification processing unit 413, and may progress the processing to step S406. In step S406, the beautification processing unit 413 may perform the beautification processing on the optimum-exposure image as described with reference to the flowchart of FIG. 6, and may generate a beautification-processed image that is a beautification processing result and store the beautification-processed image in the storage unit 420. When the beautification-processed image is stored, the beautification processing unit 413 may progress the processing to step S407.

In step S405, if it is determined that the painterly effect is not given to the image, the control unit 411 may control the selection unit 412 so as not to supply the optimum-exposure image to the beautification processing unit 413, and may progress the processing to step S407.

In step S407, the luminance component extracting unit 414 may read the optimum-exposure image from the storage unit 420, and may extract the luminance component from the read optimum-exposure image. The storage unit 420 may store the extracted luminance component. Also, since the luminance component may be a first component of the optimum-exposure image, the storage of the luminance component may be omitted. In step S408, the illumination separation filter 415 may read the luminance component from the storage unit 420, and may extract the illumination component from the read luminance component. The storage unit 420 may store the extracted illumination component.

In step S409, the HDR compression processing unit 416, as described with reference to the flowchart of FIG. 7, may perform HDR compression processing to read the underexposed image, the optimum-exposure image, the overexposed image, and the illumination component from the storage unit 420, and may generate an HDR compressed image using the underexposed image, the optimum-exposure image, the overexposed image, and the illumination component.

In step S410, the control unit 411 may determine whether or not to give a painterly effect to the image on which the HDR compression processing is performed. If it is determined that the painterly effect is not given to the image, the control unit 411 may control the selection unit 417 to supply the HDR compressed image to the beautification processing unit 418, and may progress the processing to step S411. In step S411, the beautification processing unit 418 may perform the beautification processing on the HDR compressed image as described with reference to the flowchart of FIG. 6, and may generate a beautification-processed image that is a beautification processing result and store the beautification-processed image in the storage unit 420. When the beautification-processed image is stored, the beautification processing unit 418 may progress the processing to step S412.

In step S412, if it is determined that the painterly effect is given to the image, the control unit 411 may control the selection unit 417 so as not to supply the HDR compressed image to the beautification processing unit 418, and may progress the processing to step S412.

In step S412, the painterly processing unit 419 may read the beautification-processed image (beautification processing result) generated in step S411, the luminance component of the optimum-exposure image, and the illumination component of the luminance component from the storage unit 420, and may emphasize detail of the beautification-processed image using the beautification-processed image, the luminance component of the optimum-exposure image, and the illumination component of the luminance component. Thus, the HDR image in which the detail is emphasized may be output to the outside of the image processing apparatus 400, and may be stored in the storage unit 420 provided in the image processing apparatus 400.

Thus, the image processing apparatus 400 may easily combine a plurality of images with different exposure conditions to generate an image with an appropriate tonal range and simultaneously perform beautification processing on the image to improve the visual image quality in a desired region and give a painterly visual effect to the image. In other words, the image processing apparatus 400 can give more various effects to the image.

An exemplary use change of the storage unit 420 will be described with reference to FIG. 12. In FIG. 12, the horizontal axis represents the processing flow, and the vertical axis represents the size (capacity) of a storage region used. Each square schematically illustrates image data stored in the storage unit 420.

FIG. 12A illustrates an exemplary use change of the storage unit 420 in the image processing apparatus 400 of FIG. 10 when detail is excessively emphasized and a painterly visual effect is given to an image. Also, FIG. 12B illustrates another exemplary use change of the storage unit 420 in the image processing apparatus 400 of FIG. 10 when the detail is not emphasized and the painterly visual effect is not given to the image.

As shown in FIG. 12, whether the painterly visual effect is or is not given to the image, 3.5 times of a memory size of an image may be sufficient for a storage region. A required amount of memory can be reduced compared to that of FIG. 9.

Fifth Embodiment

Imaging Device

The image processing apparatus described above may be configured as a part of other devices, for example, an image processing unit. For example, the image processing apparatus may be configured as an imaging device that captures a subject and generates data of the captured image.

Figure 13:
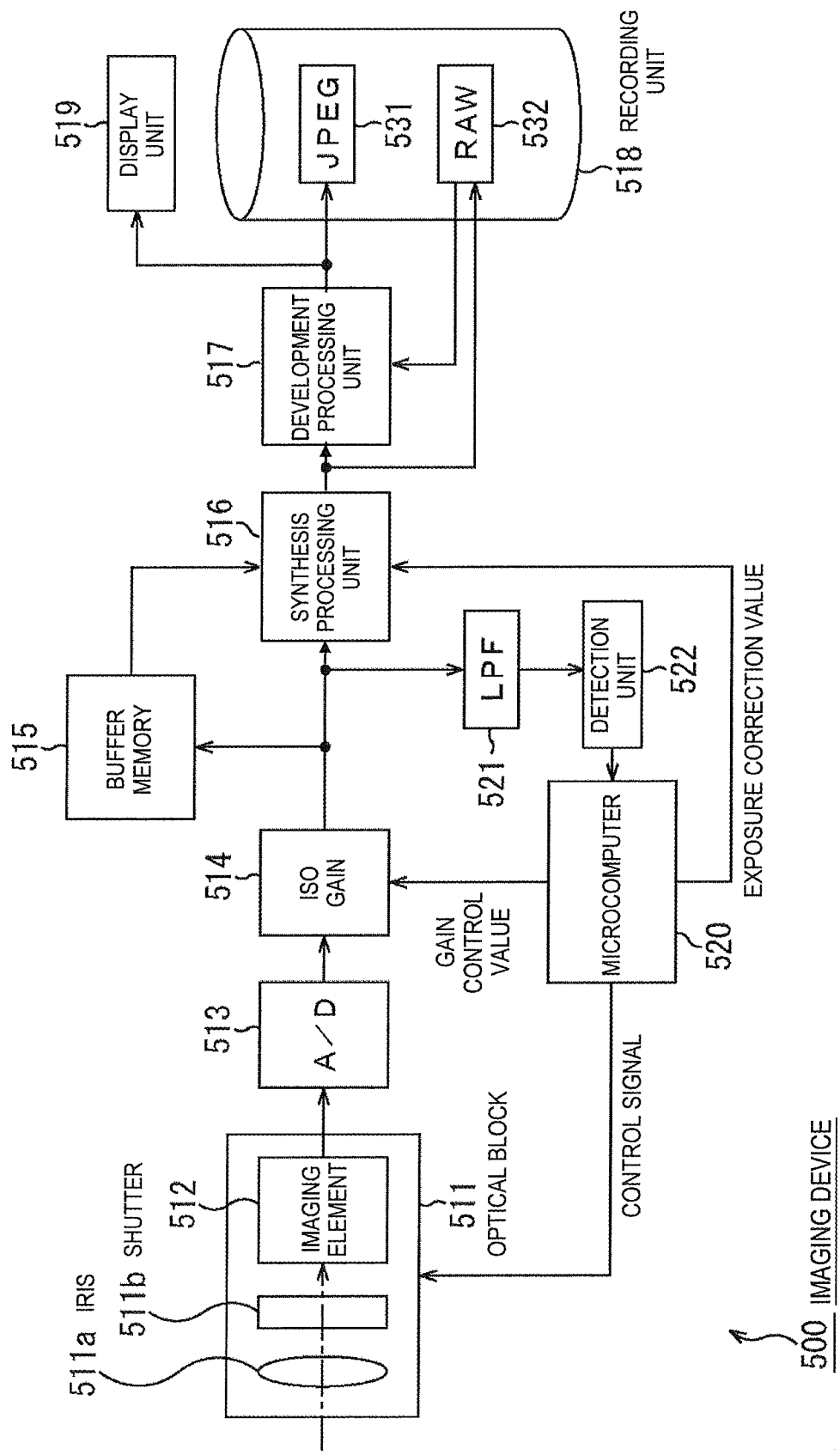
FIG. 13 is a block diagram illustrating an exemplary main configuration of an imaging device.

FIG. 13 is a block diagram illustrating an exemplary configuration of an imaging device. An imaging device 500 shown in FIG. 13 may be a device that captures a subject and generates and outputs the image data of the subject. The imaging device 500 may include the image processing apparatus 100 of FIG. 1, the image processing apparatus 200 of FIG. 2, the image processing apparatus 300 of FIG. 3, or the image processing apparatus 400 of FIG. 10 as an image processing unit.

An optical block 511 may include a lens for concentrating light from a subject on an imaging element 512, a driving mechanism (not shown) for executing focusing and zooming by moving the lens, an iris 511a, and a shutter 511b. The driving mechanism in the optical block 511 may be driven according to a control signal from a microcomputer 520. The imaging element 512 may include a Charge Coupled Device (CCD) type image device, a Complementary Metal-Oxide Semiconductor (CMOS) type image device, or the like, and may convert incident light from the subject into electrical signals.

An A/D conversion unit (A/D) 513 may convert image signals output from the imaging element 512 into digital data. An International Organization for Standardization (ISO) gain controlling unit 514 may provide a certain gain with respect to each component of Red, Green and Blue (RGB) of image data from the A/D conversion unit 513 according to gain control values from the microcomputer 520. Also, the adjustment of the ISO gain may be performed in an analog image signal stage prior to input into the A/D conversion unit 513.

A buffer memory 515 may temporarily store a plurality of image data acquired by exposure bracketing that is performed several times with different exposures. A combination processing unit 516 may receive an exposure correction value applied upon exposure bracketing from the microcomputer 520, and may combine a plurality of images in the buffer memory 515 into one image on the basis of the exposure correction value.

A development processing unit 517 may be a block that performs so-called RAW development processing in which RAW image data mainly output from the combination processing unit 516 is converted into visual image data. The development processing unit 517 may perform data interpolation (de-mosaic) processing, various color adjustment/conversion processing (white balance adjustment processing, high-luminance knee compression processing, gamma correction processing, aperture correction processing, and clipping processing), or image compression encoding processing according to a certain encoding method (here, a Joint Photographic Experts Group (JPEG) method is used).

In the following embodiments, the bit number of RAW image data output from the A/D conversion unit 513 may be 12 bits, and the development processing unit 517 may have specifications for processing 12-bit data. Also, the development processing unit 517 may compress 12-bit data into 8-bit data by the high-luminance knee compression processing (or cutoff of low-order bit) in the development processing procedure, and may perform compression encoding processing with respect to the 8-bit data. Also, the development processing unit 516 may output the 8-bit data on a display unit 519.

A recording unit 518 may be a device for preserving image data acquired by imaging as a data file, and may be realized with portable flash memories and Hard Disk Drives (HDDs). Also, the recording unit 518 may record the RAW image data 532 output from the combination processing unit 516 in addition to JPEG data 531 encoded by the development processing unit 517 as a data file. The development processing unit 517 may read the RAW image data recorded in the recording unit 518 to allow the RAW image data to be processed in the development processing unit 516 and newly recorded as a JPEG data file in the recording unit 518.

The display unit 519 may include a monitor including, for example, a Liquid Crystal Display (LCD). The display unit 519 may generate an image signal for monitor display and supply the image signal to the monitor based on the uncompressed image data processed in the development processing unit 517. In a preview state of a captured image before recording, captured image signals may be continuously output from the image element 512, and after digital conversion, the digital image data may be supplied to the development processing unit 517 through the ISO gain controlling unit 514 and the combination processing unit 516 to undergo development processing (other than encoding processing). The display unit 519 may display an image (preview image) sequentially output from the development processing unit 517 on the monitor, and then a user can see the preview image with his/her eyes to confirm the view angle.

The microcomputer 520 may include a Central Processing Unit (CPU), a Read Only Memory (ROM), and a Random Access Memory (RAM), and may completely control the imaging device 500 by executing programs stored in the ROM. For example, in this embodiment, an exposure correction value may be calculated based on a detection result from the detection unit 522, and a control signal according to the value may be output to control the iris 511a or the shutter 511b. Thus, automatic exposure (AE) control may be achieved. Also, when wide dynamic range imaging to be described later is performed, the combination processing unit 516 may be notified of the calculated exposure correction value.

A Lowpass Filter (LPF) 521 may perform LPF processing according to necessity with respect to the image data output from the ISO gain controlling unit 514. The detection unit 522 may be a block that performs various detections on the basis of the image data supplied from the ISO gain controlling unit 514 through the LPF 521, and in this embodiment, may divide the image into certain photometric regions and detect luminance values for each photometric region.

In the imaging device 500 described above, an image processing unit having the same configuration and performing the same processing as the image processing apparatus 100 of FIG. 1, the image processing apparatus 200 of FIG. 2, the image processing apparatus 300 of FIG. 3, or the image processing apparatus 400 of FIG. 10 may be configured as a part or all of the development processing unit 517.

Thus, the combination processing unit 516 and the development processing unit 517 may easily combine a plurality of images with different exposure conditions to generate an image with an appropriate tonal range and simultaneously give a painterly visual effect to the image. In other words, the image processing apparatus 300 can give more various effects to the image.

That is, in the imaging device 500, a plurality of images acquired by exposure bracketing are easily combined, and an image given a painterly visual effect may be acquired. The image may be displayed on the display unit 519 or may be recorded as the JPEG data 531 in the recording unit 518. The image processing apparatus 500 can give more various effects to the image.

The encoding method of the image data recorded in the recording unit 518 may be arbitrary. The recording unit 518 may also store the image data encoded by an encoding method other than JPEG.

5. Sixth Embodiment

Personal Computer

The sequential processing described above may be executed by hardware or software. In this case, a personal computer may be configured as shown in FIG. 14.

In FIG. 14, a Central Processing Unit (CPU) 601 of a personal computer 600 may execute various kinds of processing according to a program stored in a Read Only Memory (ROM) 602, or a program loaded in a Random Access Memory (RAM) 603 from a storage unit. Also, data necessary for the CPU 601 to execute various kinds of processing may be appropriately stored in the RAM 603.

The CPU 601, the ROM 602, and the RAM 603 may be connected to each other through a bus 604. Also, the bus 604 may be connected to an input/output (I/O) interface 610.

The I/O interface 610 may be connected to an input unit 611 including a keyboard and a mouse, an output unit 612 including a display such as Cathode Ray Tube (CRT) or Liquid Crystal Display (LCD) and a speaker, the storage unit 613 including a hard disk, and a communication unit 614 including a modem. The communication unit 614 may perform communication processing through a network including Internet.

A drive 615 may be connected to the I/O interface 610 according to necessity, and removable media 621 such as a magnetic disk, an optical disc, a magneto-optical disc, and a semiconductor memory may be appropriately mounted.

Computer programs read from the removable media 621 may be installed in the storage unit 613 according to necessity.

When the sequential processing is executed by software, programs constituting the software may be installed from a network or a recording medium.

As shown in FIG. 14, the recording media may be configured in the removable media 621 including magnetic disks (including flexible disks), optical discs (including a Compact Disc-Read Only Memory (CD-ROM) and a Digital Versatile Disc (DVD)), magneto-optical discs (including a Mini Disc (MD)), or semiconductor memories, on which programs are recorded to be distributed to a user independently of the main body of the device. Also, the recording media may be configured in the ROM 602 on which programs are recorded and delivered to a user in a state of being pre-assembled in the main body of the device or a hard disk included in the storage unit 613.

Programs executed by a computer may be performed in time-series according to the description order of the present disclosure, or may be performed in parallel or at necessary timings when called.

In the present disclosure, steps of describing programs recorded in recording media may include processing performed in time-series according to the description order and processing not processed in time-series but performed in parallel or individually.

In the present disclosure, a system may represent the whole of a device configured by a plurality of devices.

Also, the configuration described above as one device (or processing unit) may be divided into a plurality of devices (or processing units). On the other hand, the configuration described above as a plurality of devices (or processing units) may be integrated into one device. Also, other components may be added to the configuration of each device (or each processing unit). As long as the configuration or operation of the system is substantially similar as a whole, a part of the configuration of any device (or processing unit) may also be allowed to be included in other devices (or other processing units). The embodiments of the present disclosure are not limited to the above-mentioned embodiments, but can be variously modified within the scope of the present disclosure.

Also, the present technology may be configured as follows.

(1) An image processing apparatus including:
a first image processing unit configured to perform image processing affecting a high frequency component used to generate a detail component of an image;
a detail component generating unit configured to generate the detail component, which is emphasized, using an output of the first image processing unit; and
an emphasis unit configured to emphasize detail of the image by combining the emphasized detail component generated by the detail component generating unit with the image.

(2) The image processing apparatus according to (1), wherein the image processing includes reducing an unnecessary high frequency component.

(3) The image processing apparatus according to (2), wherein the image processing includes beautification processing for reducing the unnecessary high frequency component of a desired region.

(4) The image processing apparatus according to (3), wherein the beautification processing includes skin-beautifying processing that reduces the unnecessary high frequency component of a skin region.

(5) The image processing apparatus according to any one of (1) to (4), further including:

an emphasis amount controlling unit configured to control an emphasis amount of the detail component generated by the detail component generating unit; and
a processing controlling unit configured to control whether to perform the image processing by the first image processing unit,
wherein the processing controlling unit controls the first image processing unit to perform the image processing when the emphasis amount controlling unit sets the emphasis amount to a large value, and controls the first image processing unit not to perform the image processing when the emphasis amount controlling unit sets the emphasis amount to a small value.

(6) The image processing apparatus according to any one of (1) to (5), further including a combination unit configured to generate an image in which a tonal range of a luminance signal is compressed, by combining a plurality of images with different exposure conditions,
wherein the emphasis unit emphasizes the detail of the image generated by the combination unit, by combining the emphasized detail component generated by the detail component generating unit with the image.

(7) The image processing apparatus according to (6), wherein the plurality of images with different exposure conditions include an underexposed image with decreased exposure below an optimum value, an optimum-exposure image with optimum exposure, and an overexposed image with increased exposure beyond the optimum value, and the first image processing unit performs the image processing on the optimum-exposure image.

(8) The image processing apparatus according to (6) or (7), further including a second image processing unit configured to perform the image processing on the image obtained by combining by the combination unit,
wherein the emphasis unit emphasizes detail of the image on which the second image processing unit performs the image processing, by combining the emphasized detail component generated by the detail component generating unit with the image.

(9) The image processing apparatus according to (1), further including:
a combination unit configured to generate an image in which a tonal range of a luminance signal is compressed, by combining a plurality of images with different exposure conditions and the component in which the image processing is performed by the first image processing unit;
a second image processing unit configured to perform the image processing on the image combined by the combination unit;
an emphasis amount controlling unit configured to control an emphasis amount of the detail component generated by the detail component generating unit; and
a processing controlling unit configured to control whether to perform the image processing by the first image processing unit and the second image processing unit,
wherein the processing controlling unit controls the first image processing unit to perform the image processing and controls the second image processing unit not to perform the image processing when the emphasis amount controlling unit sets the emphasis amount to a large value, and controls the second image processing unit to perform the image processing and controls the first image processing unit not to perform the image processing when the emphasis amount controlling unit sets the emphasis amount to a small value.

(10) The image processing apparatus according to (9), wherein the plurality of images with different exposure conditions include an underexposed image with decreased exposure below an optimum value, an optimum-exposure image with optimum exposure, and an overexposed image with increased exposure beyond the optimum value, and the first image processing unit performs the image processing on the optimum-exposure image.

(11) An image processing method using an image processing apparatus, including:

performing image processing affecting a high frequency component used to generate a detail component of an image;

generating the detail component, which is emphasized, using the component on which the image processing affecting the high frequency component is performed; and emphasizing detail of the image by combining the emphasized detail component with the image.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-117468 filed in the Japan Patent Office on May 25, 2011, the entire content of which is hereby incorporated by reference.

What is claimed is:

1. An image processing apparatus comprising:
a first image processing device configured to perform image processing affecting a high frequency component used to generate a detail component of an image;
a detail component generating device configured to generate the detail component, which is emphasized, using an output of the first image processing device;
an emphasis device configured to emphasize detail of the image by combining the emphasized detail component generated by the detail component generating device with the image;
an emphasis amount controlling device configured to control an emphasis amount of the detail component generated by the detail component generating device; and
a processing controlling device configured to control whether to perform the image processing by the first image processing device,
wherein the processing controlling device controls the first image processing device to perform the image processing depending on a value set for the emphasis amount.

2. The image processing apparatus according to claim 1, wherein the image processing comprises reducing an unnecessary high frequency component.

3. The image processing apparatus according to claim 2, wherein the image processing comprises beautification processing for reducing the unnecessary high frequency component of a desired region.

4. The image processing apparatus according to claim 3, wherein the beautification processing comprises skin-beautifying processing that reduces the unnecessary high frequency component of a skin region.

5. The image processing apparatus according to claim 1, further comprising a combination device configured to generate an image in which a tonal range of a luminance signal is compressed by combining a plurality of images with different exposure conditions,
wherein the emphasis device emphasizes the detail of the image generated by the combination device by combining the emphasized detail component generated by the detail component generating device with the image.

6. The image processing apparatus according to claim 5, wherein the plurality of images with different exposure conditions comprise an underexposed image with decreased exposure below an optimum value, an optimum-exposure image with optimum exposure, and an overexposed image with increased exposure beyond the optimum value, and the first image processing device performs the image processing on the optimum-exposure image.

7. The image processing apparatus according to claim 5, further comprising a second image processing device configured to perform the image processing on the image generated by the combination device,
wherein the emphasis device emphasizes detail of the image on which the second image processing device performs the image processing by combining the emphasized detail component generated by the detail component generating device with the image.

8. An image processing apparatus comprising:
a first image processing device configured to perform image processing affecting a high frequency component used to generate a detail component of an image;
a detail component generating device configured to generate the detail component, which is emphasized, using an output of the first image processing device;
an emphasis device configured to emphasize detail of the image by combining the emphasized detail component generated by the detail component generating device with the image;
a combination device configured to generate an image in which a tonal range of a luminance signal is compressed by combining a plurality of images with different exposure conditions and the output of the first image processing device;
a second image processing device configured to perform the image processing on the image combined by the combination device;
an emphasis amount controlling device configured to control an emphasis amount of the detail component generated by the detail component generating device; and
a processing controlling device configured to control whether to perform the image processing by the first image processing device and the second image processing device,
wherein the processing controlling device controls the first image processing device to perform the image processing and controls the second image processing device not to perform the image processing depending on a value set for the emphasis amount, and controls the second image processing device to perform the image processing and controls the first image processing device not to perform the image processing depending on the value set for the emphasis amount.

9. The image processing apparatus according to claim 8, wherein the plurality of images with different exposure conditions comprise an optimum-exposure image with optimum exposure, an underexposed image with decreased exposure, and an overexposed image with increased exposure, and the first image processing device performs the image processing on the optimum-exposure image.

* * * * *